US012649149B2

(12) United States Patent
Son et al.

(10) Patent No.: US 12,649,149 B2
(45) Date of Patent: Jun. 9, 2026

(54) CARBON DIOXIDE REDUCING PHOTOCATALYST AND PREPARATION METHOD THEREFOR, AND CARBON DIOXIDE REDUCING METHOD

(71) Applicant: Korea University Research and Business Foundation, Sejong Campus, Sejong-si (KR)

(72) Inventors: Ho Jin Son, Suwon-si (KR); Sang Ook Kang, Sejong-si (KR)

(73) Assignee: Korea University Research Foundation and Business Foundation, Sejong Campus, Sejong-si (KR)

( * ) Notice: Subject to any disclaimer, the term of this patent is extended or adjusted under 35 U.S.C. 154(b) by 1096 days.

(21) Appl. No.: 17/686,988

(22) Filed: Mar. 4, 2022

(65) Prior Publication Data

US 2022/0193637 A1      Jun. 23, 2022

Related U.S. Application Data

(63) Continuation of application No. PCT/KR2020/011959, filed on Sep. 4, 2020.

(30) Foreign Application Priority Data

Sep. 4, 2019     (KR) ........................ 10-2019-0109675

(51) Int. Cl.
| | |
|---|---|
| *B01J 23/36* | (2006.01) |
| *B01J 21/06* | (2006.01) |
| *B01J 35/39* | (2024.01) |
| *B01J 37/00* | (2006.01) |
| *B01J 37/04* | (2006.01) |

(52) U.S. Cl.
CPC ............ *B01J 23/36* (2013.01); *B01J 21/063* (2013.01); *B01J 35/39* (2024.01); *B01J 37/0009* (2013.01); *B01J 37/04* (2013.01)

(58) Field of Classification Search
None
See application file for complete search history.

(56) References Cited

U.S. PATENT DOCUMENTS 10,212,932 B2      2/2019   Chiattello et al.

FOREIGN PATENT DOCUMENTS

| KR | 10-2005-0037071 A | 4/2005 |
|---|---|---|
| KR | 10-2017-0058091 A | 5/2017 |
| KR | 10-2017-0100181 A | 9/2017 |

(Continued)

OTHER PUBLICATIONS

Won et al., Organic-Inorganic hybrid photocatalyst for carbon dioxide reduction, Faraday Discuss., 2017 (Year: 2017).*

(Continued)

*Primary Examiner* — Keling Zhang
(74) *Attorney, Agent, or Firm* — Secant IP, PLLC

(57) ABSTRACT

A carbon dioxide reducing photocatalyst is provided. The carbon dioxide reducing photocatalyst comprises: an electron receptor comprising a metal oxide; a polymer concentrator deposited on the electron receptor; and a metal catalyst deposited on the electron receptor, wherein electrons move from the polymer concentrator to the metal catalyst through the conduction band of the electron receptor if the polymer concentrator absorbs light.

2 Claims, 28 Drawing Sheets

(56) References Cited

FOREIGN PATENT DOCUMENTS

| KR | 10-2018-0129307 A | 12/2018 |
| KR | 10-2019-0072512 A | 6/2019 |

OTHER PUBLICATIONS

Zhang et al., "P3HT/Ag/TiO2 ternary photocatalyst with significantly enhanced activity under both visible light and ultraviolet irradiation" Applied Surface Science, vol. 488, pp. 228-236 (Sep. 15, 2019).

International Search Report for International Application No. PCT/KR2020/011959 dated Dec. 14, 2020, 3 pages.

Written Opinion of the International Searching Authority for International Application No. PCT/KR2020/011959 dated mailed Dec. 14, 2020, 5 pages.

* cited by examiner

200 before     12 h     24 h     36 h     48 h     60 h (a)

(b)

(a)

(b)

(a)

(b)

before       830h       after

CARBON DIOXIDE REDUCING PHOTOCATALYST AND PREPARATION METHOD THEREFOR, AND CARBON DIOXIDE REDUCING METHOD

CROSS-REFERENCE TO RELATED APPLICATION

This application is a continuation of International Application PCT/KR2020/011959 (filed 4 Sep. 2020), the entire disclosure of which is hereby incorporated by reference herein.

TECHNICAL FIELD

The present invention relates to a carbon dioxide reducing photocatalyst and a preparation method therefor, and a carbon dioxide reducing method, and more particularly, to a carbon dioxide reducing photocatalyst and a preparation method therefor, and a carbon dioxide reducing method to reduce carbon dioxide to carbon monoxide through a photocatalyst.

BACKGROUND ART

In general, various chemical substances exist in the atmospheric environment, and the chemical substances do not cause problems in the ecological environment under normal conditions and concentrations. However, as industrialization continues, chemicals are discharged more excessively due to the use of all kinds of industrial machinery and transport equipment. More importantly, the excessive discharge of all kinds of chemicals eventually lead to air pollution.

Many types of air pollutants currently exist, and the most common and observed air pollutants are carbon dioxide (CO2), sulfur dioxide (SO2), nitrogen oxides (NOx), suspended particulates, ozone (O3) and volatile organic compounds (VOCs). The air pollutants directly and indirectly affect both humans and the environment. The direct impacts include damage to the health of humans, animals, and plants living in the biosphere, and on the other hand, the indirect impacts include environmental problems caused by acid rain and global warming.

The Earth's atmosphere contains, as main "greenhouse gases", carbon dioxide (CO2), methane (CH4), and nitrogen dioxide (NO2). So-called "greenhouse gases" refer to the above atmospheric gases that contribute to increase the Earth's temperature. The rise of global temperature is currently the most important environmental problem. At this point, carbon dioxide (CO2) has the greatest influence on the global warming. Accordingly, various technologies for decreasing the amount of carbon dioxide (CO2) are being researched and developed.

For example, Korean Unexamined Patent Publication No. 10-2018-0129307 (Application No.: 10-2017-0065130, Applicant: Korea Institute of Science and Technology) discloses the technology including: (A) dissolving a copper precursor in an organic solvent and then performing a first heat treatment to prepare a copper precursor solution; (B) preparing a carbon support solution by ultrasonically dispersing the carbon support in a mixed solution in which a fixing agent and an organic solvent are mixed; and (C) performing a second heat treatment by mixing the copper precursor solution and the carbon support solution, wherein copper and copper oxide nanoparticles of various sizes and shapes are manufactured, used and applied as a Cu/C-based electrode with excellent electrochemical carbon dioxide reduction performance.

DISCLOSURE

Technical Problem

One technical problem to be solved by the present invention is to provide a carbon dioxide reducing photocatalyst and a preparation method therefor, and a carbon dioxide reducing method to have improved carbon dioxide reduction efficiency.

Another technical problem to be solved by the present invention is to provide a carbon dioxide reducing photocatalyst and a preparation method therefor, and a carbon dioxide reducing method to have improved carbon dioxide reduction stability.

Still another technical problem to be solved by the present invention is to provide a carbon dioxide reducing photocatalyst and a preparation method therefor, and a carbon dioxide reducing method to have an improved lifespan.

Still another technical problem to be solved by the present invention is to provide a carbon dioxide reducing photocatalyst and a preparation method therefor, and a carbon dioxide reducing method so as to be replaceable with conventional organometallic compounds or organic dyes.

The technical problems to be solved by the present invention are not limited to the above description.

Technical Solution

In order to solve the above-mentioned technical problems, the present invention provides a carbon dioxide reducing photocatalyst.

According to one embodiment, the carbon dioxide reducing photocatalyst includes: an electron acceptor including a metal oxide; a polymer concentrator deposited on the electron acceptor; and a metal catalyst deposited on the electron acceptor, wherein electrons move from the polymer concentrator to the metal catalyst through the conduction band of the electron acceptor when the polymer concentrator absorbs light.

According to one embodiment, the carbon dioxide reducing photocatalyst may further include an additive adsorbed on an surface of the electron acceptor to control an energy level of the electron acceptor, wherein the energy level of the electron acceptor to which the additive is adsorbed may have a difference within a reference range from a first reduction potential of the metal catalyst.

According to one embodiment, the energy level of the electron acceptor to which the additive is adsorbed may be −1.5 V to −1.8 V (vs. SCE).

According to one embodiment, the additive may include any one of water (H2O), trifluoroethanol (TFE), or triethanolamine (TEOA).

According to one embodiment, the polymer concentrator P3HT (poly 3-hexyl thiophene, P3HT) may include poly 3-hexyl thiophene (P3HT).

According to one embodiment, the metal oxide may include any one of titanium dioxide (TiO2), tungsten trioxide (WO3), tin oxide (SnO2), or zinc oxide (ZnO).

According to one embodiment, the metal catalyst may include rhenium (Re).

In order to solve the above-mentioned technical problems, the present invention provides a method for preparing a carbon dioxide reducing photocatalyst.

According to one embodiment, the method for preparing a carbon dioxide reducing photocatalyst includes: preparing for a first source solution containing a polymer concentrator; providing an electron acceptor including a metal oxide in the source solution to prepare a preliminary photocatalyst in which the polymer concentrator is deposited on the electron acceptor; and depositing the metal catalyst on the electron acceptor by providing the preliminary photocatalyst in a second source solution containing a metal catalyst.

In order to solve the above-mentioned technical problems, the present invention provides a method for reducing carbon dioxide.

According to one embodiment, the method for reducing carbon dioxide includes: preparing for the carbon dioxide reducing photocatalyst according to the embodiment; mixing the carbon dioxide reducing photocatalyst with an electron donor and a photoreaction solvent; and providing the electron donor and the photoreaction solvent to the carbon dioxide reducing photocatalyst and irradiating light.

According to one embodiment, the photoreaction solvent may include an additive adsorbed on a surface of the electron acceptor to control an energy level of the electron acceptor.

Advantageous Effects

The carbon dioxide reducing photocatalyst according to the embodiment of the present invention includes: an electron acceptor including a metal oxide; a polymer concentrator deposited on the electron acceptor; and a metal catalyst deposited on the electron acceptor, wherein electrons move from the polymer concentrator to the metal catalyst through the conduction band of the electron acceptor when the polymer concentrator absorbs light. Accordingly, the carbon dioxide reducing photocatalyst having improved carbon dioxide reduction efficiency and stability can be provided.

DESCRIPTION OF DRAWINGS

FIG. 4 is a chemical formula of a polymer concentrator and a metal catalyst used in the preparation process of the carbon dioxide reducing photocatalyst according to the embodiment of the present invention.

FIG. 5 is a chemical formula of a polymer concentrator used in the preparation process of the carbon dioxide reducing photocatalyst according to another embodiment of the present invention.

BEST MODE

Mode for Invention

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification herein, when one component is mentioned as being on other component, it signifies that the one component may be placed directly on the other component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

Figure 1:
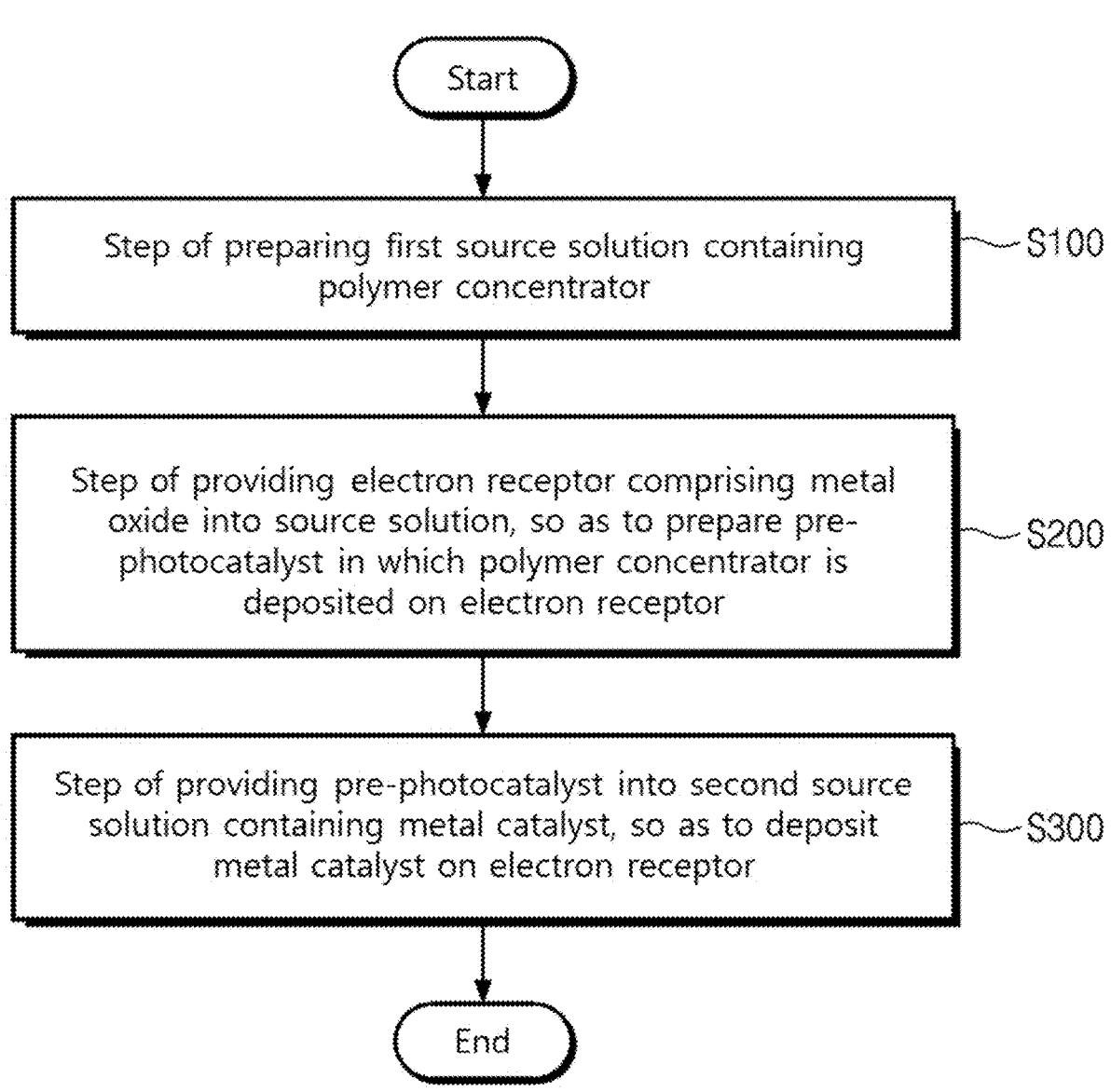
FIG. 1 is a flowchart explaining a method for preparing carbon dioxide reducing photocatalyst according to the embodiment of the present invention.
Figure 2:
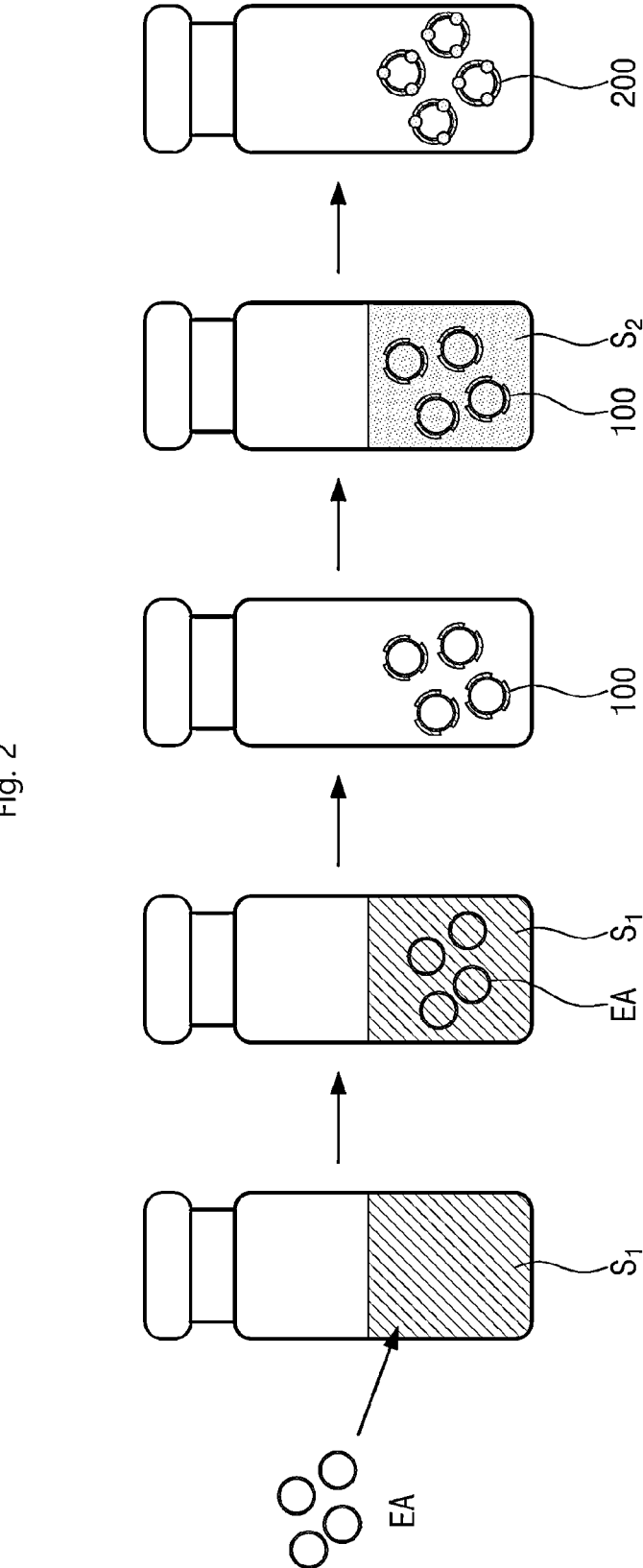
FIG. 2 is a view showing a preparation process of the carbon dioxide reducing photocatalyst according to the embodiment of the present invention.
Figure 3:
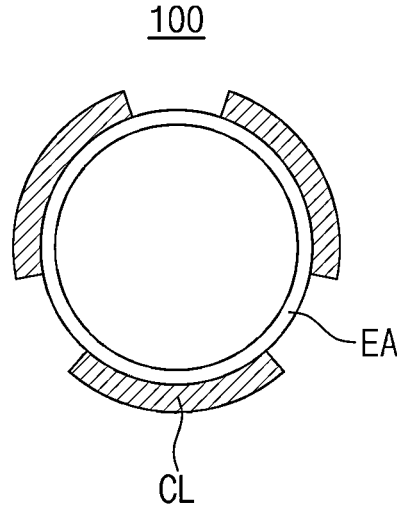
FIG. 3 is a schematic view of a preliminary photocatalyst and a carbon dioxide reducing photocatalyst formed during the preparation process of the carbon dioxide reducing photocatalyst according to the embodiment of the present invention.
Figure 3:
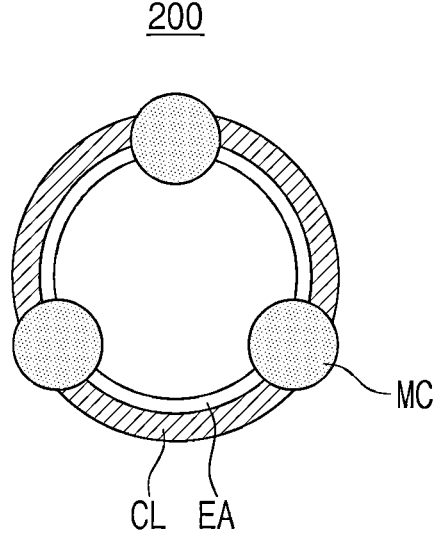
Figure 4:
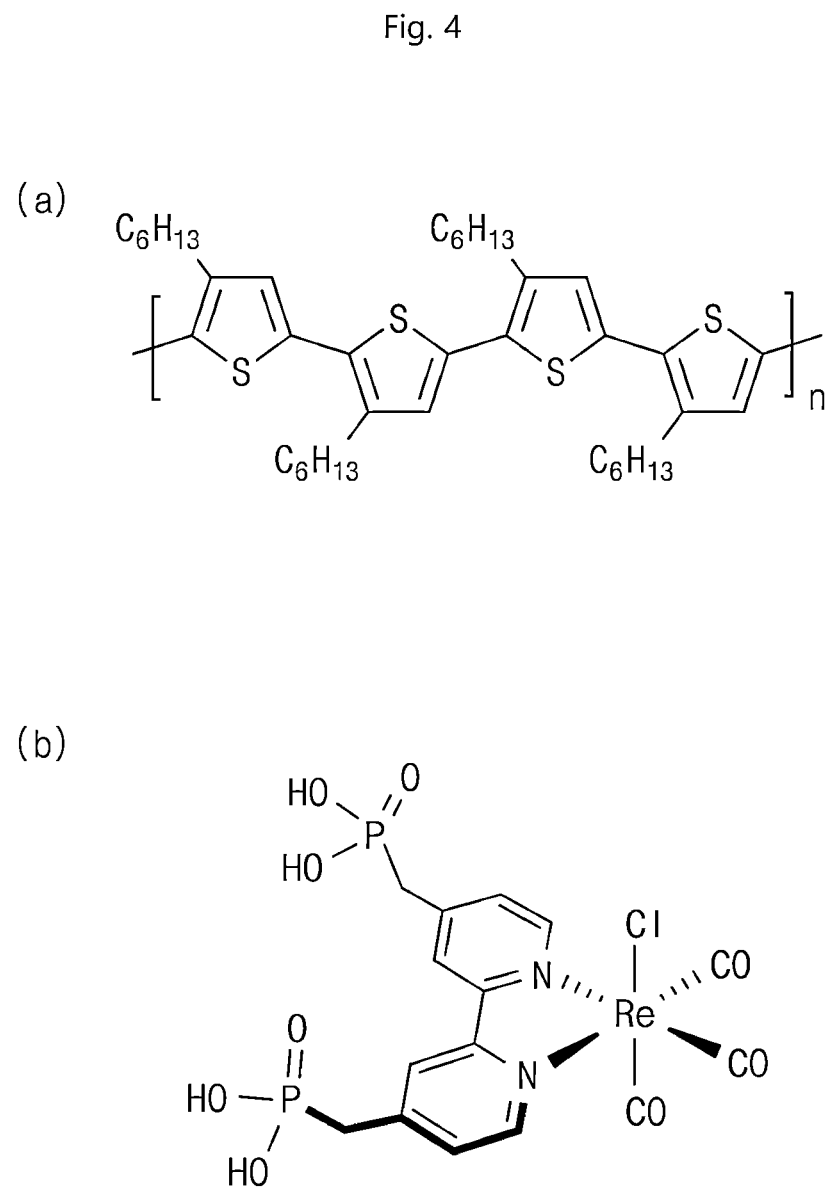
Figure 5:
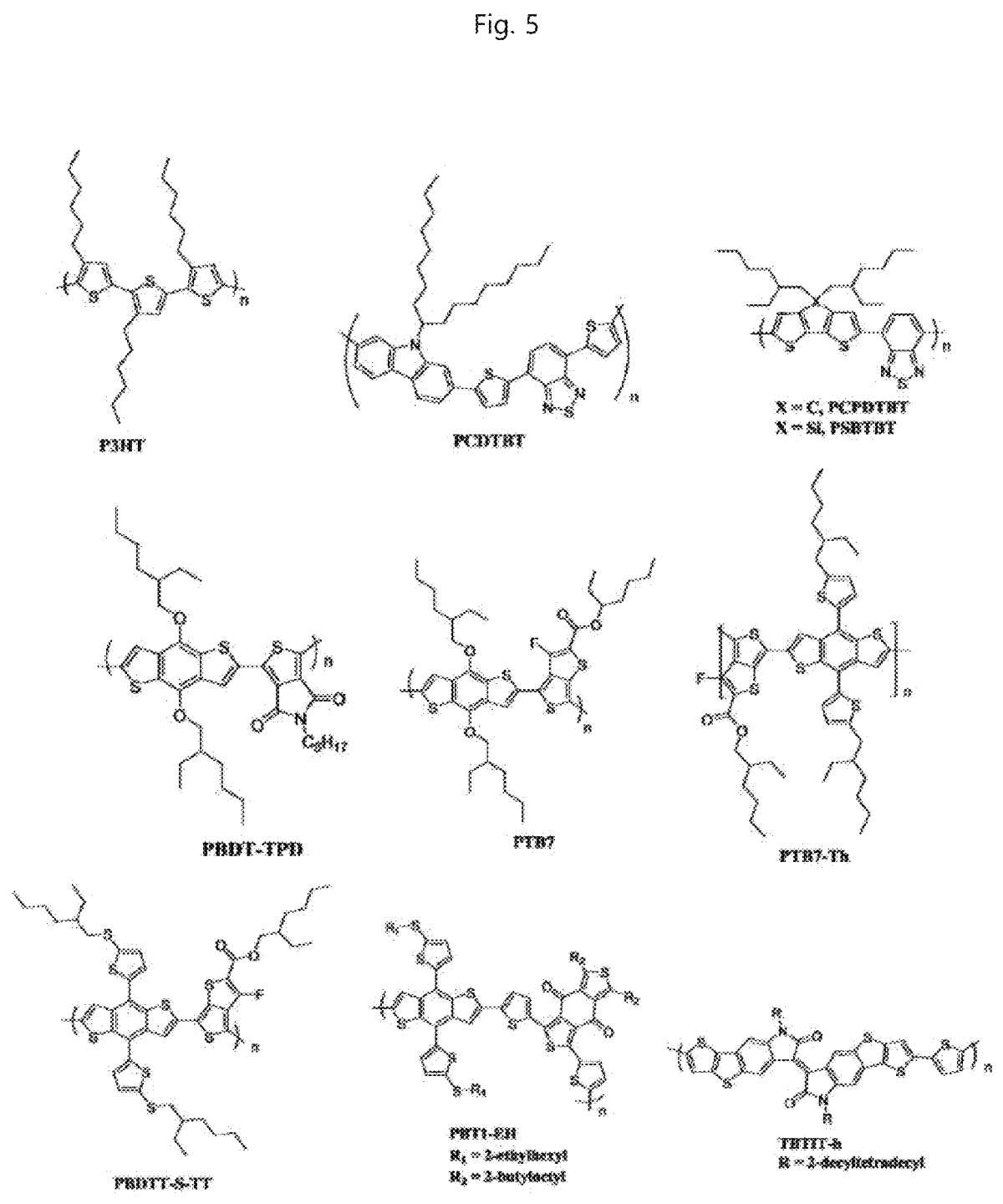
Figure 6:
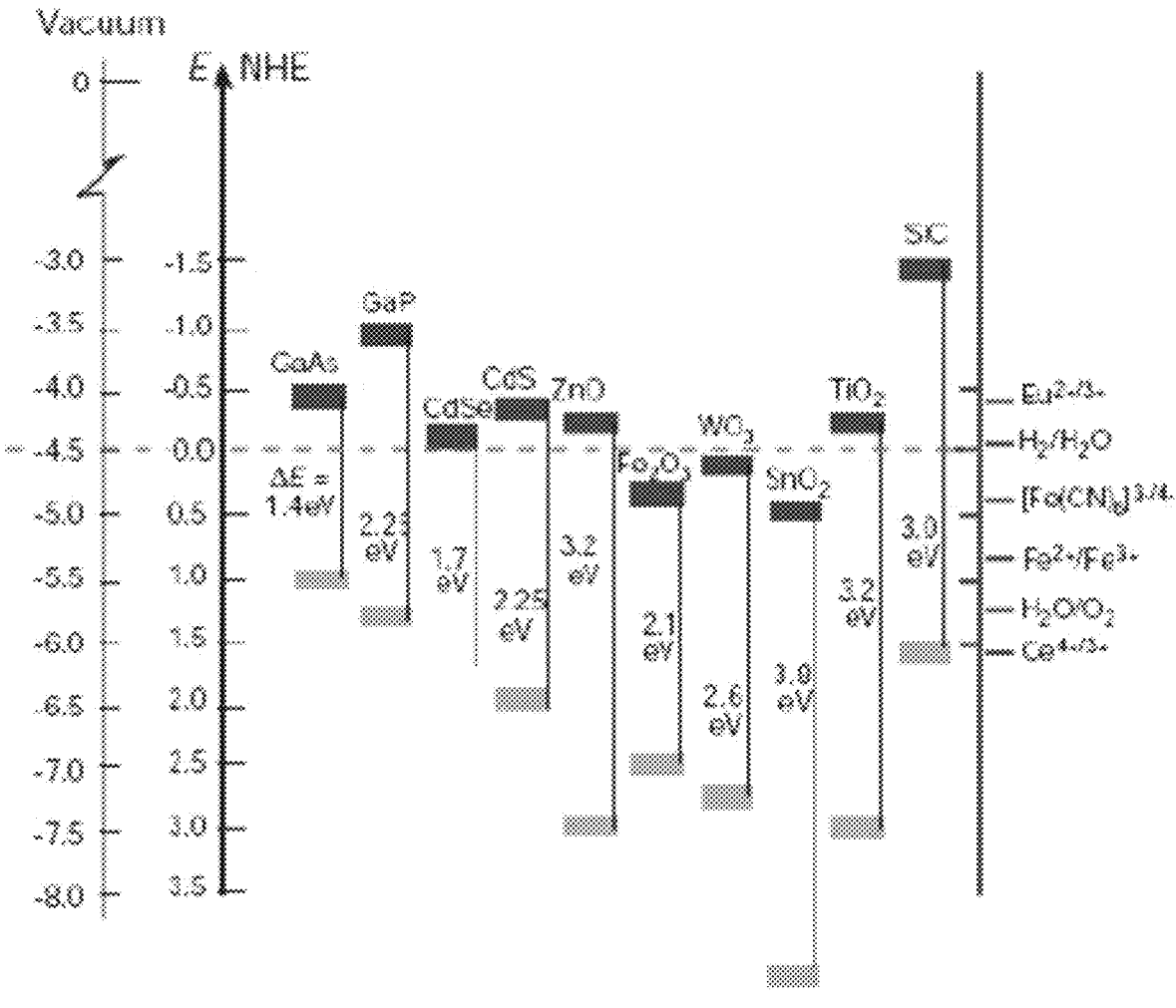
FIG. 6 is a view showing an energy level of an electron acceptor used in the preparation process of the carbon dioxide reducing photocatalyst according to another embodiment of the present invention.
Figure 7:
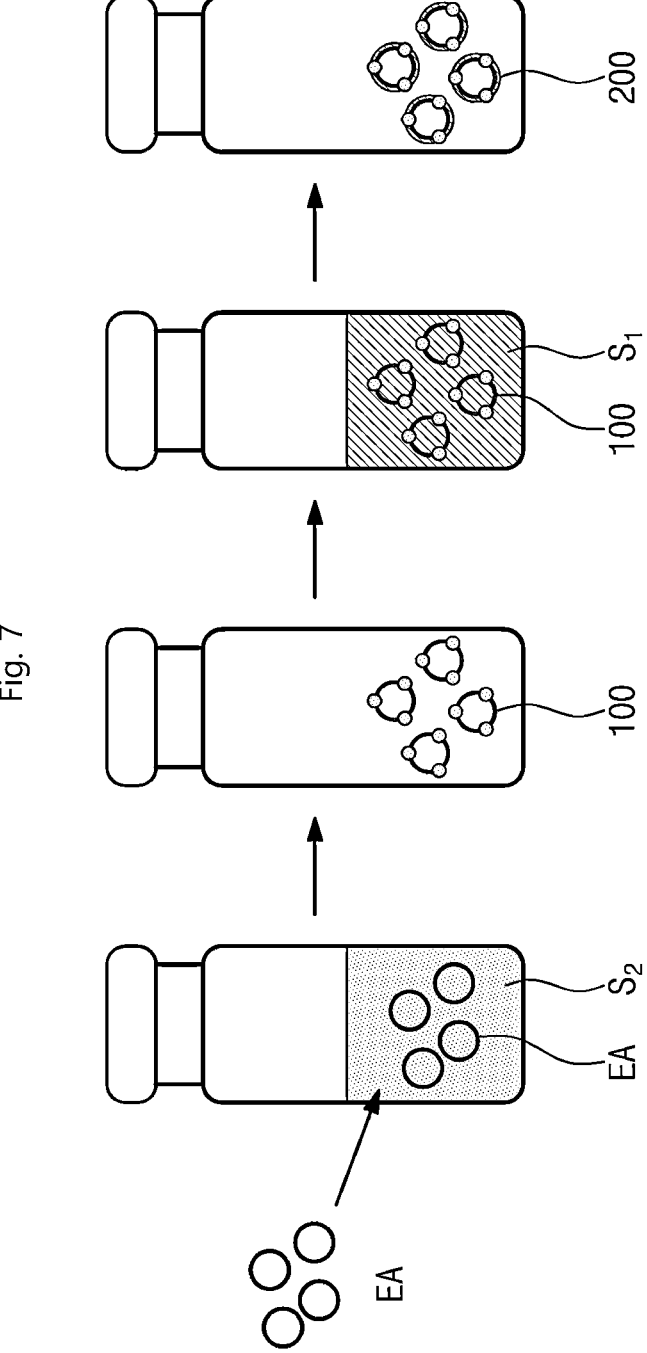
FIG. 7 is a view showing a preparation process of the carbon dioxide reducing photocatalyst according to another embodiment of the present invention.
Figure 8:
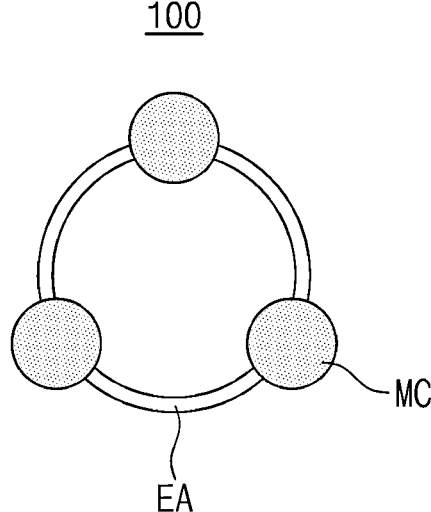
FIG. 8 is a schematic view of a preliminary photocatalyst and a carbon dioxide reducing photocatalyst formed during the preparation process of the carbon dioxide reducing photocatalyst according to another embodiment of the present invention.
Figure 8:
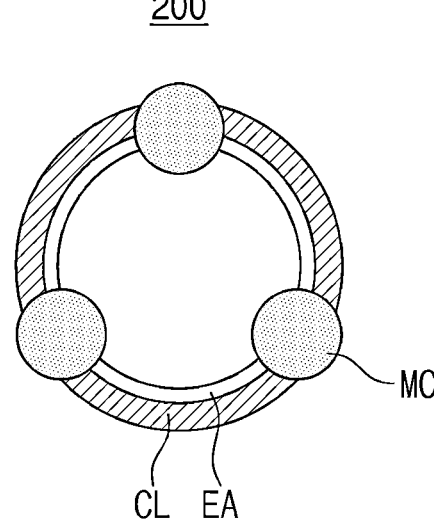
Figure 9:
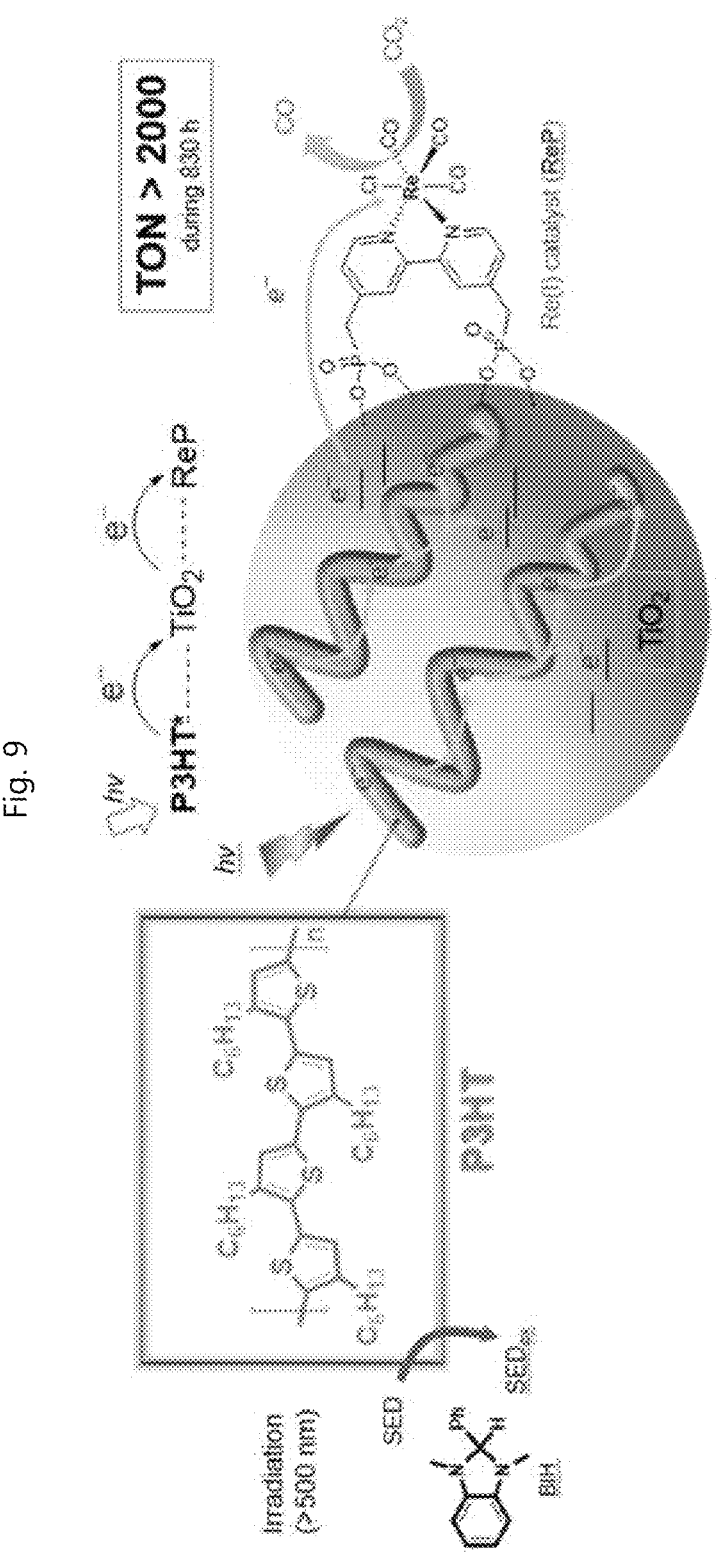
FIG. 9 is a schematic view of a carbon dioxide reduction process through the carbon dioxide reducing photocatalyst according to the embodiment of the present invention.
Figure 10:
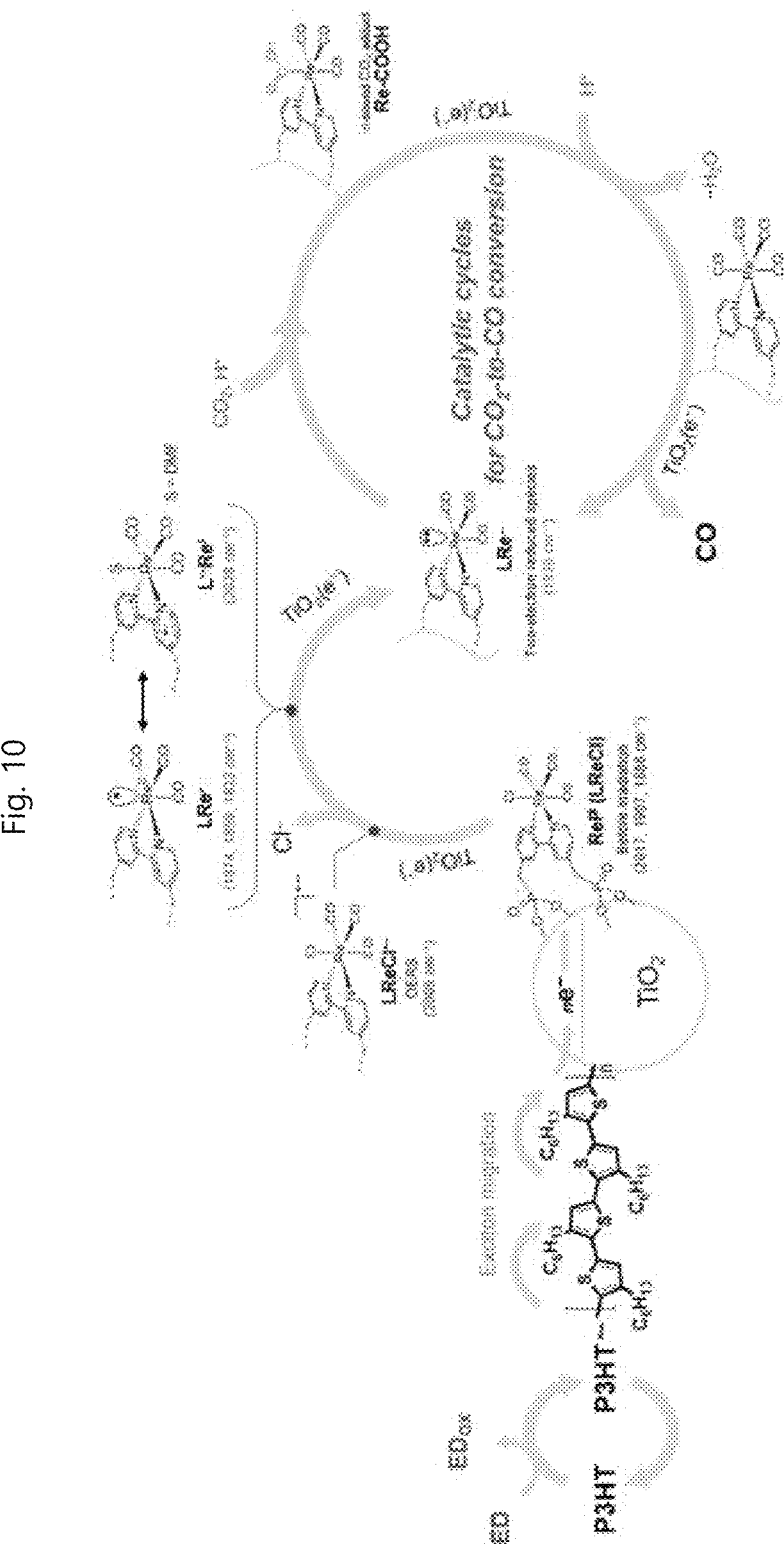
FIG. 10 is a view showing a photoreaction mechanism of the carbon dioxide reducing photocatalyst according to the embodiment of the present invention.

FIG. 1 is a flowchart explaining a method for preparing carbon dioxide reducing photocatalyst according to the embodiment of the present invention. FIG. 2 is a view showing a preparation process of the carbon dioxide reducing photocatalyst according to the embodiment of the present invention. FIG. 3 is a schematic view of a preliminary photocatalyst and a carbon dioxide reducing photocatalyst formed during the preparation process of the carbon dioxide reducing photocatalyst according to the embodiment of the present invention. FIG. 4 is a chemical formula of a polymer concentrator and a metal catalyst used in the preparation process of the carbon dioxide reducing photocatalyst according to the embodiment of the present invention. FIG. 5 is a chemical formula of a polymer concentrator used in the preparation process of the carbon dioxide reducing photocatalyst according to another embodiment of the present invention. FIG. 6 is a view showing an energy level of an electron acceptor used in the preparation process of the carbon dioxide reducing photocatalyst according to the embodiment of the present invention. FIG. 7 is a view showing a preparation process of the carbon dioxide reducing photocatalyst according to another embodiment of the present invention. FIG. 8 is a schematic view of a preliminary photocatalyst and a carbon dioxide reducing photocatalyst formed during the preparation process of the carbon dioxide reducing photocatalyst according to another embodiment of the present invention. FIG. 9 is a schematic view of a carbon dioxide reduction process through the carbon dioxide reducing photocatalyst according to the embodiment of the present invention. FIG. 10 is a view showing a photoreaction mechanism of the carbon dioxide reducing photocatalyst according to the embodiment of the present invention.

Referring to FIGS. 1 to 5, a first source solution S1 including a polymer concentrator CL is prepared (S100). According to one embodiment, the polymer concentrator CL may include poly 3-hexyl thiophene (P3HT) represented by the chemical formula shown in FIG. 4(a). According to one embodiment, the content of the polymer concentrator CL is controlled, so that the carbon dioxide reduction efficiency of a carbon dioxide reducing photocatalyst described later may be improved. More specifically, the content of the polymer concentrator CL may be controlled to 0.1 mg or more and 0.5 mg or less per 10 mg of an electron acceptor described later. On the contrary, when the content of the polymer concentrator CL is controlled to be less than 0.1 mg or more than 0.5 mg per 10 mg of the electron acceptor described later, the carbon dioxide reduction efficiency described later may be decreased.

For example, the first source solution (S1) may be prepared by dissolving 1.5 mg of P3HT in 10 mL of CHCl3. On the contrary, according to another embodiment, the polymer concentrator CL may include any one of PCDTBT, PBDT-TPD, PTB7, PTB7-Th, PBDTT-S-TT, PBTI-EH, or TBTIT-h as shown in FIG. 5.

The polymer concentrator CL may transfer electrons excited by absorbing light to a metal catalyst MC described later. In the related art, an organometallic compound or an organic dye has been used as a concentrator of a carbon dioxide reducing photocatalyst. The organometallic compound or the organic dye has the excellent ability for absorbing light, but has a problem in that the stability is low and the light absorption in the visible region is small, thereby lowering the carbon dioxide reduction efficiency. However, as described above when a polymer (e.g., P3HT) is used as the concentrator, the stability may be improved due to the high light durability and the exciton dispersion effect of p-type organic photovoltaics (OPVs) materials, and the carbon dioxide reduction efficiency may also be improved due to the high light absorption rate in the visible region.

An electron acceptor EA including a metal oxide may be provided in the first source solution S1. Accordingly, as shown in FIG. 3(a), a preliminary photocatalyst 100, in which the polymer concentrator CL is deposited on the electron acceptor EA, may be prepared (S200). According to one embodiment, the metal oxide may include titanium dioxide (TiO2). For example, the preliminary photocatalyst 100 may be prepared by putting and evenly dispersing 150 mg of titanium dioxide (TiO2) in the first source solution S1, and then removing CHCl3 with a rotary evaporator and drying in a vacuum state. On the contrary, according to another embodiment, the metal oxide may include any one of tungsten trioxide (WO3), tin oxide (SnO2), or zinc oxide (ZnO). On the contrary, according to another embodiment, the electron acceptor EA may include cadmium sulfide (CdS), cadmium selenide (CdSe) and the like.

The preliminary photocatalyst 100 may be provided in a second source solution S2 including a metal catalyst MC. Accordingly, as shown in FIG. 3(b), the carbon dioxide reducing photocatalyst 200 in which the polymer concentrator CL and the metal catalyst MC are deposited on the electron acceptor EA may be prepared (S300). According to one embodiment, the metal catalyst MC may include rhenium (Re), and may have a chemical formula as shown in FIG. 4(b). For example, the carbon dioxide reducing photocatalyst 200 may be prepared by putting the preliminary photocatalyst 100 into a rhenium (Re) catalyst solution and stirring for 8 hours or more, and then filtering using PTFE filter paper and drying in a vacuum state.

The electron acceptor EA may receive and store electrons from the polymer concentrator CL, and then provide the stored charge to the metal catalyst MC. The metal catalyst MC may reduce carbon dioxide ($CO_2$) to carbon monoxide (CO) by using the electrons provided from the electron acceptor EA.

More specifically, when the polymer concentrator CL absorbs light, electrons excited in the polymer concentrator CL may move to a conduction band of the electron acceptor EA through reductive quenching, and the electrons in the conduction band of the electron acceptor EA may move to a metal catalyst MC described later.

On the contrary, when carbon dioxide is reduced through the polymer concentrator CL and the metal catalyst MC in a state where the electron acceptor EA is omitted, the speed of transferring electrons from the polymer concentrator CL to the metal catalyst MC may be faster than the speed at which carbon dioxide is reduced by consuming electrons in the metal catalyst MC. Accordingly, since the excited electrons fail to be resolved, the load on the polymer concentrator CL and the metal catalyst MC increases, the carbon dioxide reduction efficiency may be decreased. However, as described above, when the electrons are transferred from the polymer concentrator CL to the metal catalyst MC through the electron acceptor EA, the electron acceptor EA may serve to store the electrons, thereby decreasing the burden applied to the polymer concentrator CL and the metal catalyst MC, so that the carbon dioxide reduction efficiency may be improved.

According to one embodiment, the energy level of the electron acceptor EA may be controlled to allow electrons to easily move from the polymer concentrator CL to the metal catalyst MC through the conduction band of the electron acceptor EA. For example, the energy level of the electron acceptor EA may be controlled to have a difference within a reference range with respect to a first reduction potential of the metal catalyst MC. As shown in FIG. 6, titanium dioxide ($TiO_2$) or tungsten trioxide ($WO_3$), tin oxide ($SnO_2$), zinc oxide (ZnO), cadmium sulfide (CdS), cadmium selenide (CdSe) and the like having an energy level similar to that of titanium dioxide ($TiO_2$) may be used as a material that may allow the energy level of the electron acceptor EA to be controlled to have the difference within the reference range with the first reduction potential of the metal catalyst MC.

More specifically, the energy level of the electron acceptor EA may be controlled through additives included in the photoreaction solvent used in the process of reducing carbon dioxide through the carbon dioxide reducing photocatalyst described later. In other words, the additive may be adsorbed to ab surface of the electron acceptor EA, so as to control the energy level of the electron acceptor EA. For example, the energy level of the electron acceptor EA to which the additive is adsorbed may be controlled to be −1.5 V to −1.8 V (vs. SCE).

As a result, the energy level of the electron acceptor EA is controlled to −1.5 V to −1.8V (vs. SCE) similar to the first reduction potential of the metal catalyst MC by the additive, and accordingly, electrons easily move from the polymer concentrator CL to the metal catalyst MC, so that the carbon dioxide reduction efficiency may be improved.

Unlike the above description, referring to FIGS. 7 and 8, the carbon dioxide reducing photocatalyst 200 may include preparing a preliminary photocatalyst 100 in which the metal catalyst MC is deposited on the electron acceptor EA, by providing the electron acceptor EA containing the metal oxide in the second source solution S2 containing the metal catalyst MC; and preparing the carbon dioxide reducing photocatalyst 200 in which the polymer concentrator CL and the metal catalyst MC are deposited on the electron acceptor EA, by providing the preliminary photocatalyst 100 in the first source solution S1 containing the polymer concentrator CL.

In other words, the method for preparing a carbon dioxide reducing photocatalyst according to the embodiment of the present invention is prepared by a sequence of depositing the polymer concentrator CL on the electron acceptor EA and then depositing the metal catalyst MC. However, the method for preparing a carbon dioxide reducing photocatalyst according to another embodiment of the present invention may be prepared by a sequence of depositing the metal catalyst MC on the electron acceptor EA and then depositing the polymer concentrator CL.

The carbon dioxide reducing photocatalyst may reduce carbon dioxide to carbon monoxide by irradiating light while providing carbon dioxide in a mixed state with an electron donor and a photoreaction solvent. According to one embodiment, the electron donor may include 1,3-dimethyl-2-phenyl-1,3-dihydrobenzimidazole (BIH). The photoreaction solvent may include an additive for controlling the energy level of the electron acceptor EA, and a solvent. For example, the additive may include at least one of water ($H_2O$), trifluoroethanol (TFE), or triethanolamine (TEOA), and the solvent may include dimethylformamide (DMF).

More specifically, referring to FIGS. 9 and 10, the polymer concentrator CL (e.g., P3HT) excited by absorbing light may be reductively quenched by the electron donor (e.g., BIH), and transfer electrons to the conduction band of the electron acceptor EA (e.g., $TiO_2$). Then, the electrons may be transferred to the metal catalyst MC (e.g., Re catalyst) in the conduction band of the electron acceptor EA (e.g., $TiO_2$) so as to proceed with a carbon dioxide reduction cycle.

The carbon dioxide reducing photocatalyst and the preparation method therefor, and the carbon dioxide reducing method according to the embodiment of the present invention have been described. Hereinafter, specific experimental examples and characteristic evaluation results on the carbon dioxide reducing photocatalyst and the preparation method therefor, and the carbon dioxide reducing method according to the embodiment of the present invention will be described.

Preparation of Carbon Dioxide Reducing Photocatalyst According to Example 1

A preliminary photocatalyst in which P3HT is deposited on $TiO_2$ is prepared by dissolving P3HT in $CHCl_3$ to prepare a first source solution, putting and evenly dispersing $TiO_2$ in the prepared first source solution, removing $CHCl_3$ with a rotary evaporator and drying in a vacuum state.

The carbon dioxide reducing photocatalyst according to Example 1 is prepared by adding the preliminary photocatalyst to the second source solution containing the rhenium catalyst ReC and stirring for at least 8 hours, filtered using PTFE filter paper and drying in a vacuum state.

Preparation of Carbon Dioxide Reducing Photocatalyst According to Example 2

A preliminary photocatalyst in which a rhenium catalyst ReC is deposited on TiO2 is prepared by adding TiO2 to the second source solution containing the rhenium catalyst ReC and stirring for 8 hours or more, removing the solvent with a rotary evaporator and drying in a vacuum state.

The carbon dioxide reducing photocatalyst according to Example 2 is prepared by putting and evenly dispersing a preliminary photocatalyst in the first source solution containing P3HT, filtered using PTFE filter paper and drying in a vacuum state.

Preparing for Carbon Dioxide Reducing Photocatalyst According to Comparative Example 1

A carbon dioxide reducing photocatalyst according to Comparative Example 1 in which P3HT is deposited on TiO2 is prepared.

Preparing for Carbon Dioxide Reducing Photocatalyst According to Comparative Example 2

A carbon dioxide reducing photocatalyst according to Comparative Example 2 in which the rhenium catalyst ReC is deposited on TiO2 is prepared.

Preparing for Carbon Dioxide Reducing Photocatalyst According to Comparative Example 3

A carbon dioxide reducing photocatalyst according to Comparative Example 3 in which P3HT and rhenium catalyst ReC are deposited on ZrO2 is prepared.

The structures of the carbon dioxide reducing photocatalysts according to the Examples and Comparative Examples are summarized in Table 1 below.

TABLE 1

| Item | Configuration |
|---|---|
| Example 1 | (P3HT + TiO2) + ReC |
| Example 2 | (TiO2 + ReC) + P3HT |
| Comparative Example 1 | TiO2 + P3HT |
| Comparative Example 2 | TiO2 + ReC |
| Comparative Example 3 | P3HT + ZrO2 + ReC |

Carbon Dioxide Reduction Experiment According to Experimental Example

After preparing for the above Examples and Comparative Examples according to the above Examples and Comparative Examples, 1,3-dimethyl-2-phenyl-1,3-dihydrobenzimidazole (BIH) and the photoreaction solvent are mixed for each of the carbon dioxide reducing photocatalysts, carbon dioxide is provided, and light with a wavelength of 500 nm or more is irradiated, so that the carbon dioxide reduction experiment is conducted. As the photoreaction solvent, a solution formed by mixing dimethylformamide (DMF) and the additive is used. As the additive, water (HO), trifluoroethanol (TFE), and triethanolamine (Triethanolamine, TEOA) are used.

Figure 11:
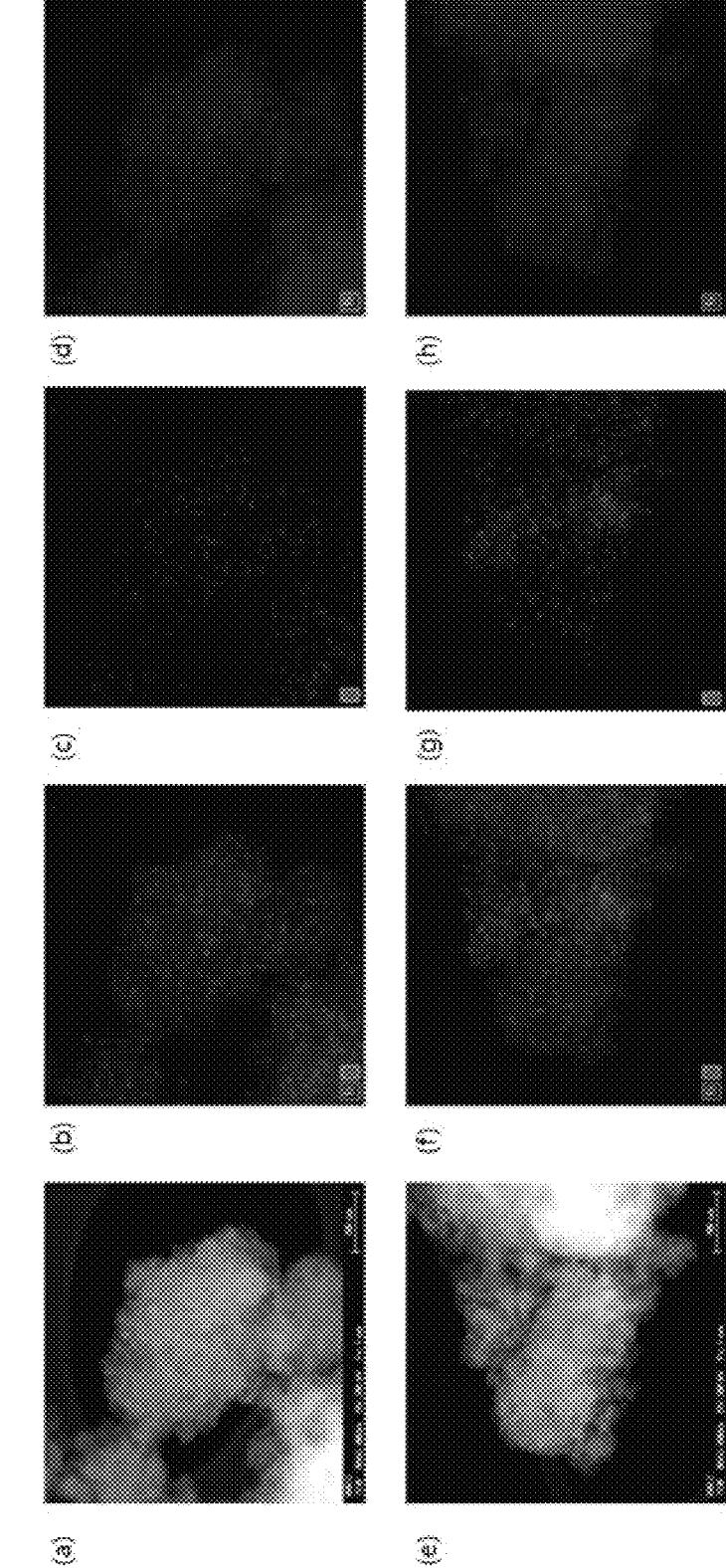
FIG. 11 is a photograph of a carbon dioxide reducing photocatalyst according to Example 1 of the present invention.

FIG. 11 is a photograph of a carbon dioxide reducing photocatalyst according to Example 1 of the present invention.

Referring to FIG. 11 (a) to (h), the carbon dioxide reducing photocatalyst according to Example 1 is prepared, in which Sample 1 prepared with 0.1 mg P3HT per 10 mg TiO2 and Sample 2 prepared with 0.5 mg of P3HT per 10 mg of TiO2 are prepared, and then each photograph for transmission electron microscope (TEM) and energy dispersive spectroscopy (EDS) is taken and shown. Specifically, FIG. 11(a) is a TEM photograph of Sample 1, FIGS. 11(b) to (d) are EDS photographs of Sample 1, FIG. 11(e) is a TEM photograph of Sample 2, and FIGS. 11(f) to (h) are EDS photographs of Sample 2.

The results analyzed through photographing Sample 1 of carbon dioxide reducing photocatalyst according to Example 1 (TiO2 10 mg/P3HT 0.1 mg) and Sample 2 (TiO2 10 mg/P3HT 0.5 mg) are summarized in Table 2 and Table 3 below, respectively.

TABLE 2

| Elemenet | At. No. | Mass (%) | Mass Norm. (%) | Atom (%) | Abs. error (%) (3 sigma) |
|---|---|---|---|---|---|
| Titanium | 22 | 99.55 | 99.55 | 99.34 | 9.20 |
| Sulfur | 16 | 0.45 | 0.45 | 0.66 | 0.19 |
| | | 100.00 | 100.00 | 100.00 | |

TABLE 3

| Elemenet | At. No. | Mass (%) | Mass Norm. (%) | Atom (%) | Abs. error (%) (3 sigma) |
|---|---|---|---|---|---|
| Titanium | 22 | 97.29 | 97.29 | 96.01 | 8.98 |
| Sulfur | 16 | 2.71 | 2.71 | 3.99 | 0.42 |
| | | 100.00 | 100.00 | 100.00 | |

Through FIG. 11, Table 2 and Table 3, it can be seen that the composition of the finally famed carbon dioxide reducing photocatalyst varies by controlling the concentration of P3HT according to the concentration of TiO2.

Figure 12:
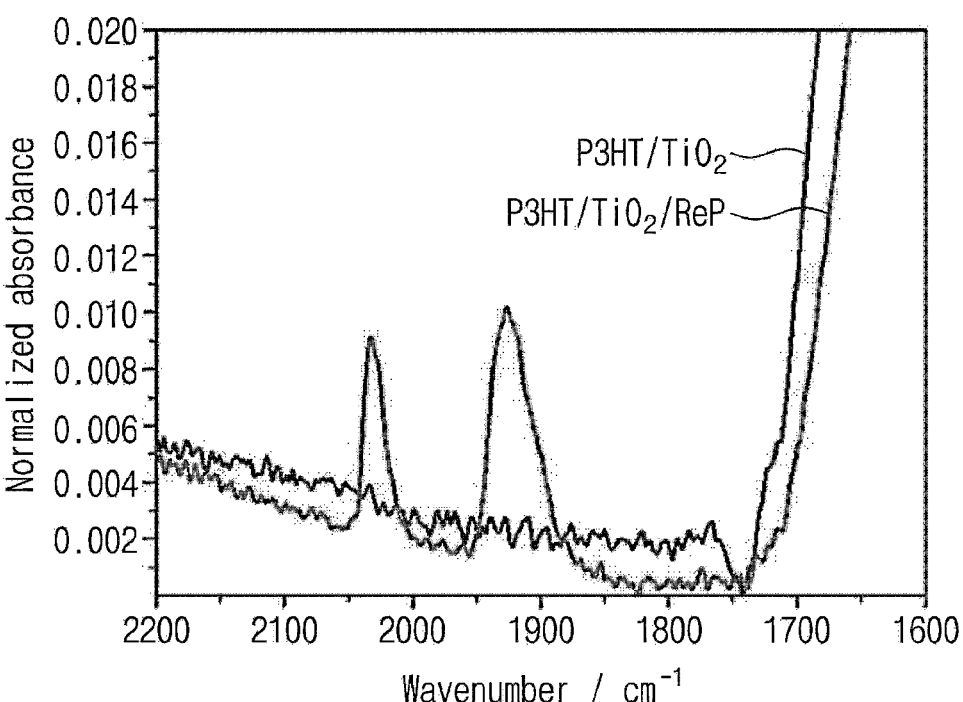
FIG. 12 is a graph of comparing the ATR spectra of the carbon dioxide reducing photocatalysts according to Example 1 and Comparative Example 1 of the present invention.

FIG. 12 is a graph of comparing the ATR spectra of the carbon dioxide reducing photocatalysts according to Example 1 and Comparative Example 1 of the present invention.

Referring to FIG. 12, ATR spectra are shown for the carbon dioxide reducing photocatalysts according to Example 1 (P3HT/TiO2/ReP) and Comparative Example 1 (P3HT/TiO2). As shown in FIG. 12, in the case of carbon dioxide reducing photocatalyst according to Example 1 it is confirmed that the peaks with a significant difference are generated in a section of 2000 to 2050 cm-1 and a section of 1900-1950 cm-1 compared to the carbon dioxide reducing photocatalyst according to Comparative Example 1.

Figure 13:
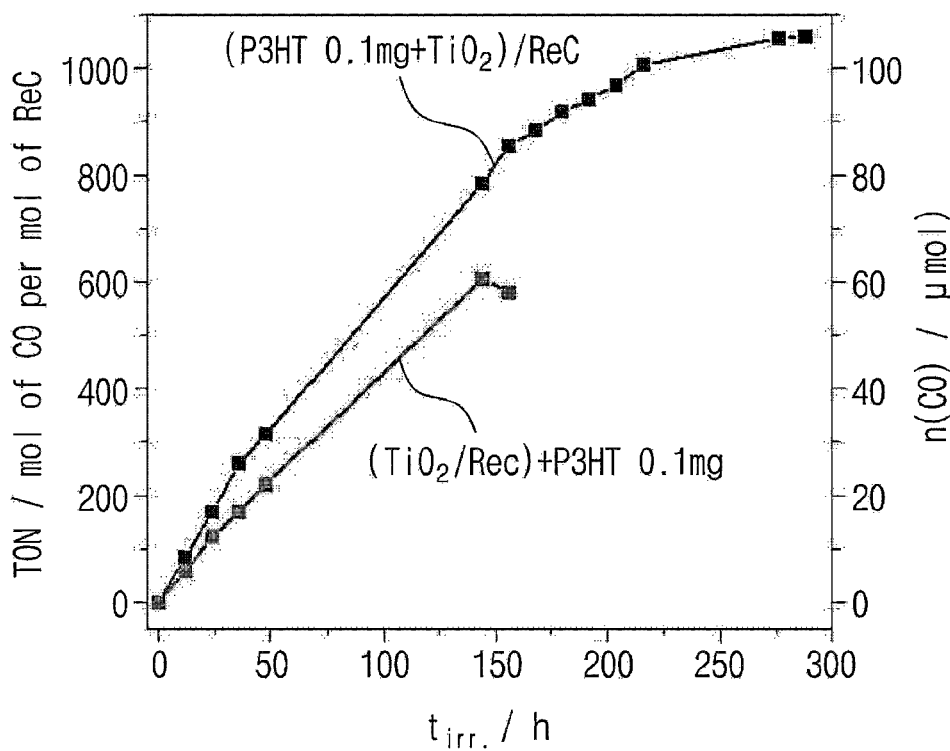
FIG. 13 is a graph of comparing the carbon dioxide reduction efficiency of the carbon dioxide reducing photocatalysts according to Example 1 and Example 2 of the present invention.

FIG. 13 is a graph of comparing the carbon dioxide reduction efficiency of the carbon dioxide reducing photocatalyst according to Example 1 and Example 2 of the present invention.

Referring to FIG. 13, after carrying out the carbon dioxide reduction experiment through Example 1 ((P3HT 0.1 mg+TiO2)/ReC) and Example 2 ((TiO2/ReC)+P3HT 0.1 mg), the carbon dioxide reduction efficiency is compared through the produced amount of carbon monoxide. As shown in FIG. 13, it is confirmed that the carbon dioxide reducing photocatalyst according to Example 1 has the carbon dioxide reduction efficiency better than that of the carbon dioxide reducing photocatalyst according to Example 2. Accordingly, it can be seen that, upon preparation of the carbon dioxide reducing photocatalyst according to the embodiment, depositing P3HT on TiO2 first and then depositing rhenium catalyst ReC may increase the carbon dioxide reduction efficiency rather than depositing rhenium catalyst Rec on TiO2 and then depositing P3HT.

Figure 14:
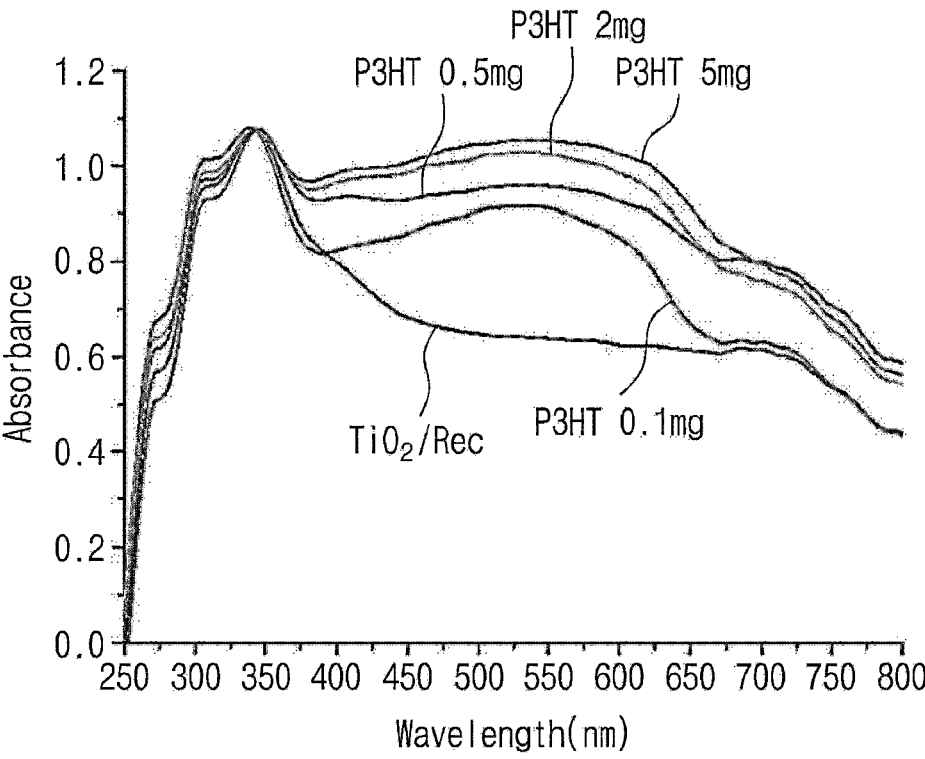
FIGS. 14 and 15 are graphs comparing the carbon dioxide reduction efficiency according to the concentration of P3HT included in the carbon dioxide reducing photocatalyst according to Example 1 of the present invention.
Figure 15:
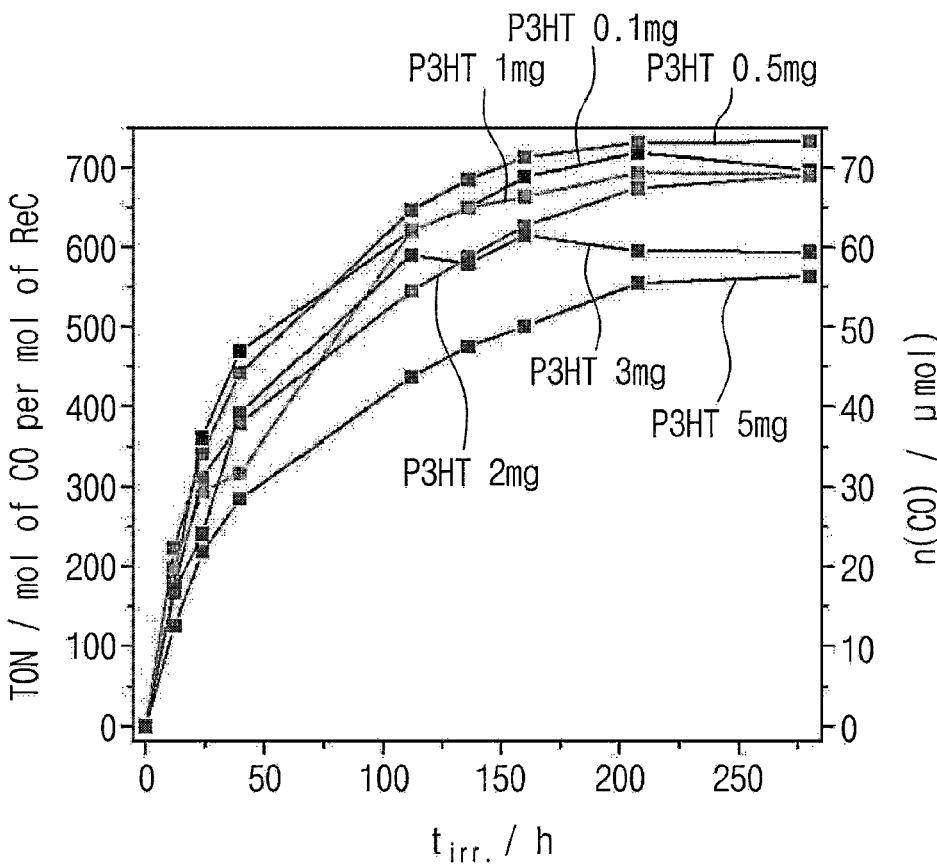

FIGS. 14 and 15 are graphs comparing the carbon dioxide reduction efficiency according to the concentration of P3HT included in the carbon dioxide reducing photocatalyst according to Example 1 of the present invention.

Referring to FIG. 14, the carbon dioxide reducing photocatalyst according to Comparative Example 2 (TiO2/ReC)

and the carbon dioxide reducing photocatalyst according to Example 1 are prepared, in which a plurality of samples having different contents of P3HT per 10 mg of TiO2 are prepared for, and then UV-DRS absorption graphs for each are shown in the process of preparing for the carbon dioxide reducing photocatalyst according to Example 1. Specifically, Sample 1 with a content of 0.1 mg of P3HT per 10 mg of TiO2, and Sample 2 of 0.5 mg, Sample 3 of 2 mg, and Sample 4 of 5 mg are prepared.

Referring to FIG. 15, the carbon dioxide reducing photocatalyst according to Example 1 is prepared, in which a plurality of samples with different P3HT contents per 10 mg of TiO2 are prepared, and then the carbon dioxide reduction experiment are performed through each sample, so that the carbon dioxide reduction efficiency is compared through the produced amount of carbon monoxide. Specifically, Sample 1 with a content of 0.1 mg of P3HT per 10 mg of TiO2, Sample 2 of 0.5 mg, Sample 3 of 2 mg, Sample 4 of 5 mg, and Sample 6 of 5 mg are prepared.

As shown through FIGS. 14 and 15, the carbon dioxide reduction efficiency of the carbon dioxide reducing photocatalysts according to sample 1 with a content of 0.1 mg of P3HT per 10 mg of TiO2 and sample 2 with 0.5 mg of TiO2 is indicated as excellent. In particular, it is found that Sample 1 exhibits the highest carbon dioxide reduction efficiency.

Figure 16:
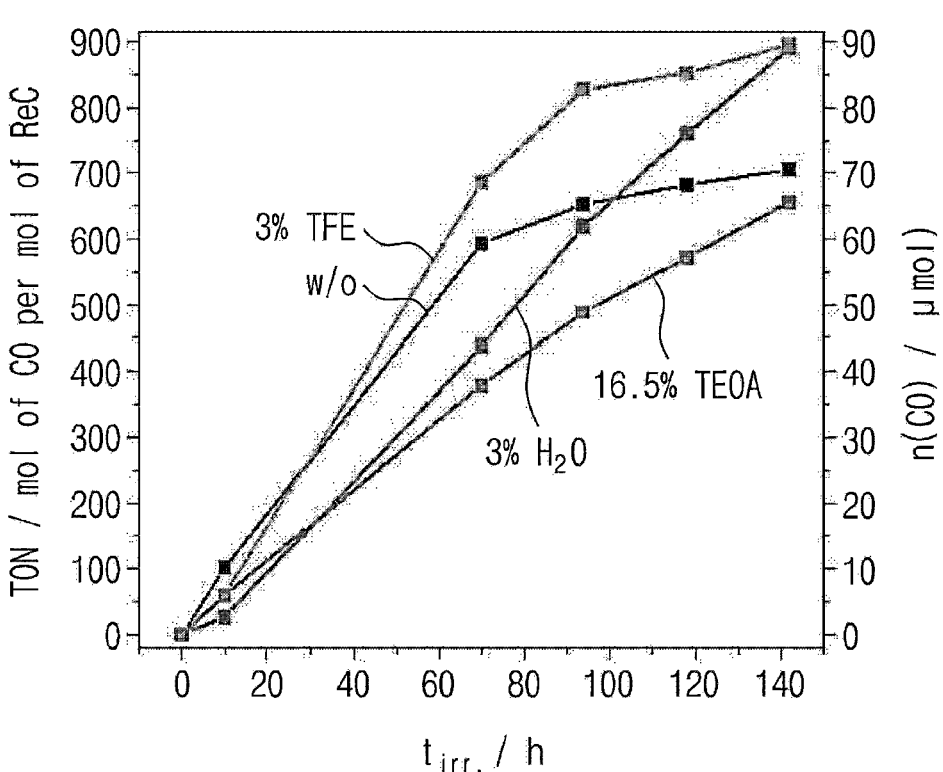
FIG. 16 is a graph of comparing the carbon dioxide reduction efficiency according to the type of additive used in the carbon dioxide reduction experiment according to the Experimental Examples of the present invention.

FIG. 16 is a graph of comparing the carbon dioxide reduction efficiency according to the type of additive used in the carbon dioxide reduction experiment according to the Experimental Examples of the present invention.

Referring to FIG. 16, the carbon dioxide reduction experiment is performed through the carbon dioxide reducing photocatalyst according to Example 1, in which the carbon dioxide reduction experiment is performed for the case that the additive used in the carbon dioxide reduction experiment is not added (w/o), the case that 3% of $H_2O$ is used as an additive, the case that 3% of TFE is used as an additive, and the case that 16.5% of TEOA is used as an additive, and then the carbon dioxide reduction efficiency is compared through the produced amount of carbon monoxide. As shown in FIG. 16, it is found that the carbon dioxide reduction efficiency and the stability are exhibited as the highest level when TEOA is used as the additive.

Figure 17:
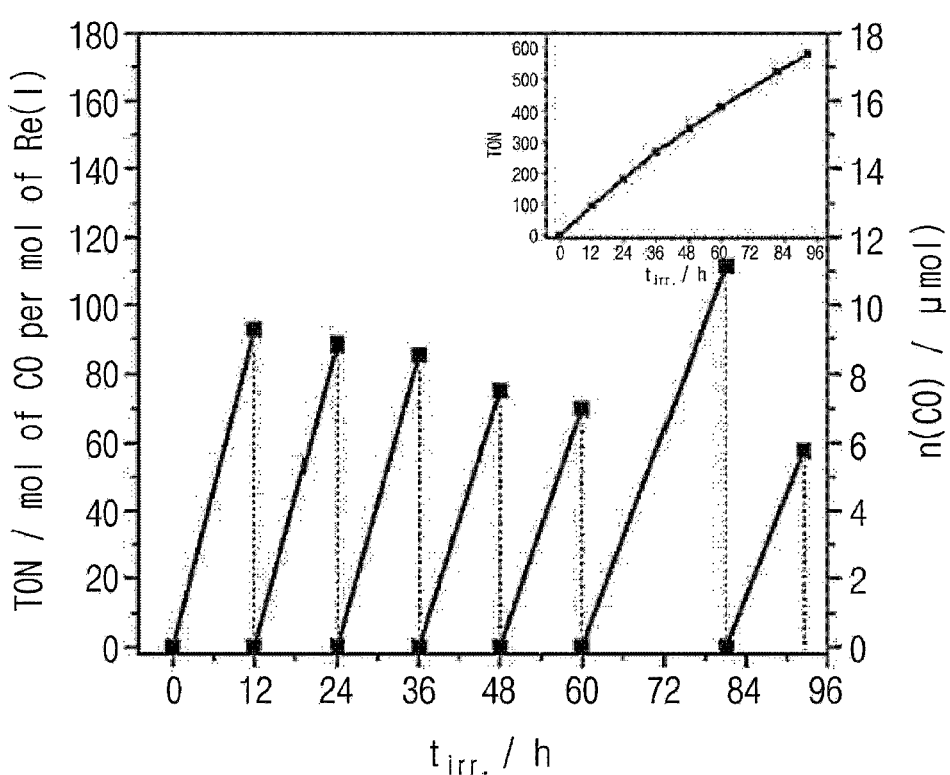
FIGS. 17 through 19 are graphs of checking the stability of the carbon dioxide reducing photocatalyst according to Example 1 of the present invention.
Figure 18:
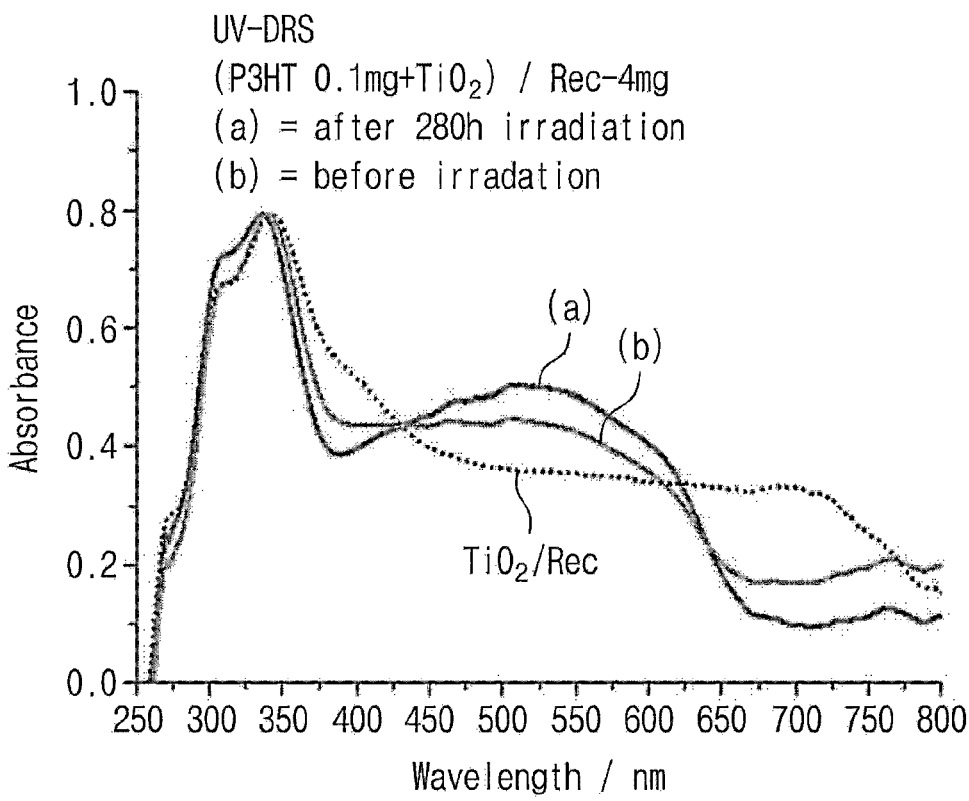
Figure 19:
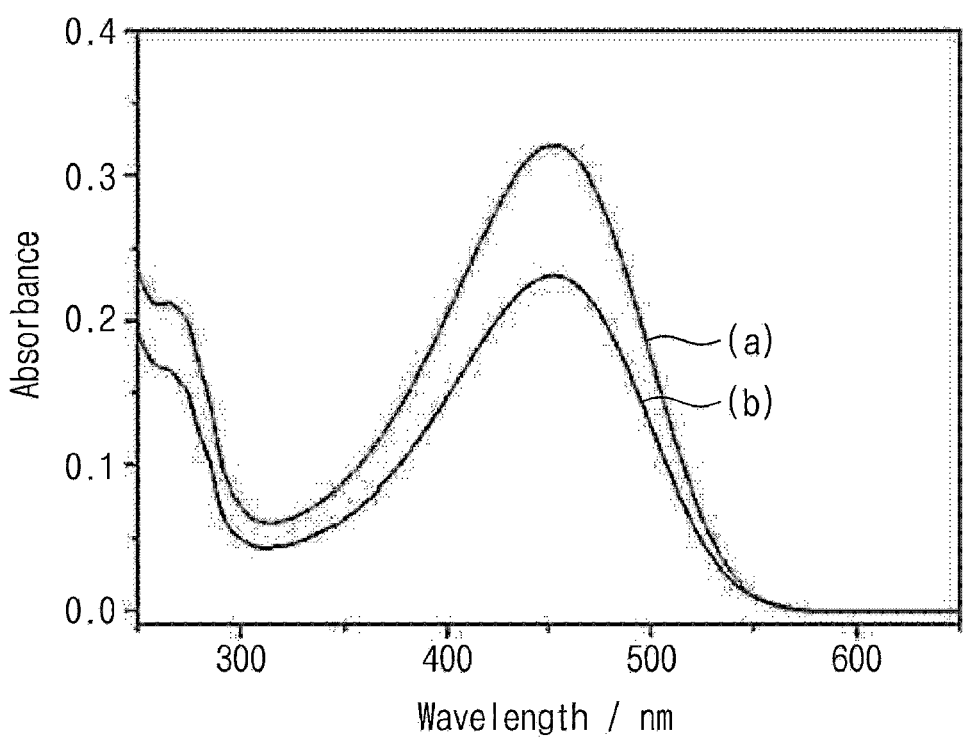

FIGS. 17 through 19 are graphs of checking the stability of the carbon dioxide reducing photocatalyst according to Example 1 of the present invention.

Referring to FIG. 17, the carbon dioxide reduction experiment is performed through the carbon dioxide reducing photocatalyst according to Example 1, in which the stability is tested by conducting a photoreaction while repeatedly injecting carbon dioxide. As shown in FIG. 17, it is confirmed that, in the case of carbon dioxide reducing photocatalyst according to Example 1, the slope of the graph is maintained substantially constant for more than 90 hours. Accordingly, it can be seen that the carbon dioxide reducing photocatalyst according to Example 1 has excellent stability.

Referring to FIG. 18, the carbon dioxide reduction experiment is performed through the carbon dioxide reducing photocatalyst according to Example 1, in which UV-DRS absorption spectra are measured and compared for before photoreaction (before irradiation) and after photoreaction (after 280 h irradiation). As shown in FIG. 18, it is confirmed that there is no significant difference in the UV-DRS absorption spectra between before photoreaction and after the photoreaction. Accordingly, it can be seen that the carbon dioxide reducing photocatalyst according to Example 1 has excellent stability.

Referring to FIG. 19, the carbon dioxide reduction experiment is performed through the carbon dioxide reducing photocatalyst according to Example 1, in which UV-DRS absorption spectra are measured and compared for before photoreaction (before irradiation) and after photoreaction (after 280 h irradiation). However, the carbon dioxide reducing photocatalyst after the photoreaction is measured after removing DMF and being dissolved in chloroform. As shown in FIG. 19, it is confirmed that there is no significant difference in the UV-DRS absorption spectra between before photoreaction and after the photoreaction. Accordingly, it can be seen that the carbon dioxide reducing photocatalyst according to Example 1 has excellent stability.

Figure 20:
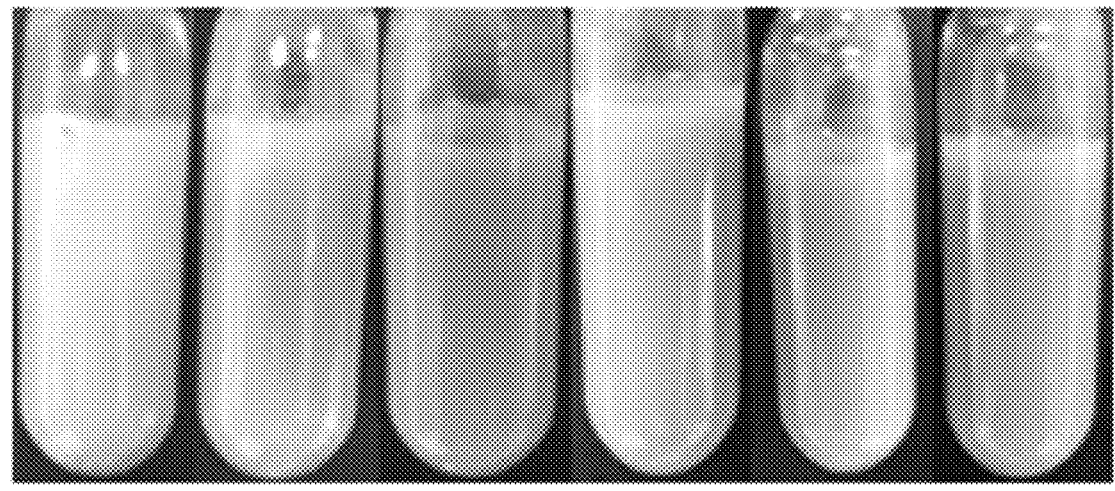
FIG. 20 is a photograph of changes in the carbon dioxide reducing photocatalyst according to Example 1 of the present invention base on the photoreaction time changes.

FIG. 20 is a photograph showing the change of the photocatalyst for carbon dioxide reduction according to the change of the photoreaction time in Example 1 of the present invention.

Referring to FIG. 20, after performing a carbon dioxide reduction experiment through the photocatalyst for carbon dioxide reduction according to Example 1, the photocatalyst for carbon dioxide reduction according to Example 1 was photographed and shown according to time change. As can be seen in FIG. 20, it was confirmed that the bright red color (P3HT unique color) was maintained substantially constant despite the lapse of the photoreaction time. Accordingly, it can be seen that the photocatalyst for reducing carbon dioxide according to Example 1 has high stability.

Figure 21:
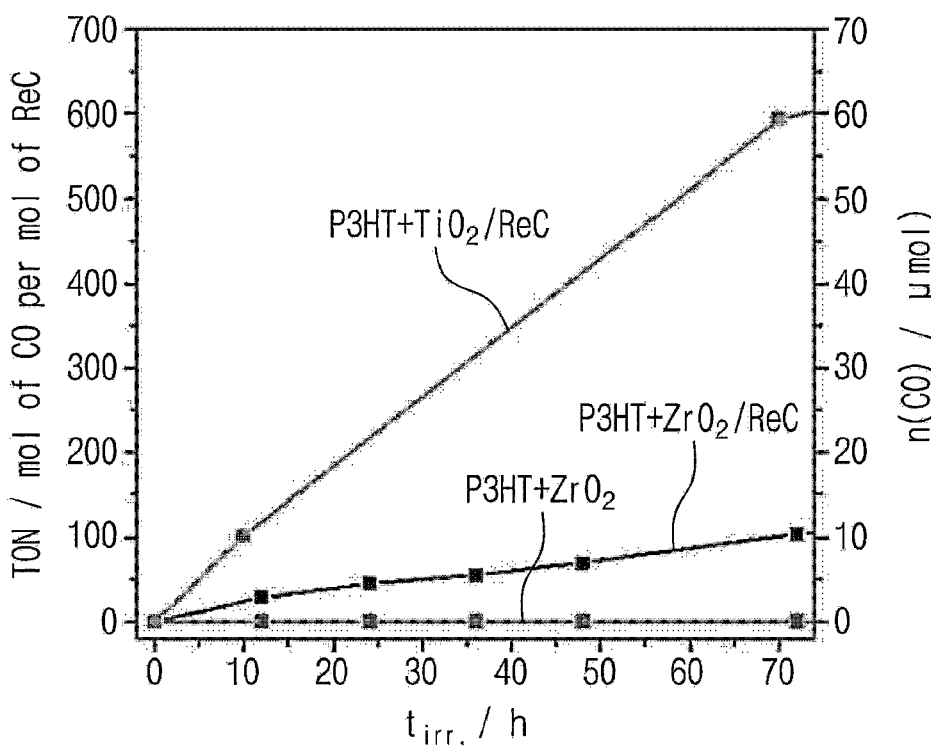
FIG. 21 is a graph of comparing the reduction efficiency of the carbon dioxide reducing photocatalyst according to Example 1 of the present invention with the reduction efficiency of the carbon dioxide reducing photocatalysts according to Comparative Examples 1 and 3.

FIG. 21 is a graph for comparing the reduction efficiency of the photocatalyst for carbon dioxide reduction according to Example 1 of the present invention with the reduction efficiency of the photocatalyst for carbon dioxide reduction according to Comparative Examples 1 and 3.

Referring to FIG. 21, a carbon dioxide reduction experiment was performed through a photocatalyst for carbon dioxide reduction according to Example 1 (P3HT+TiO2/ReC), Comparative Example 1 (P3HT+TiO2), and Comparative Example 3 (P3HT+ZrO2/ReC), and the carbon dioxide reduction efficiency was compared through the amount of produced carbon monoxide.

As can be seen in FIG. 21, in the case of the photocatalyst for carbon dioxide reduction according to Comparative Example 1 without a rhenium catalyst (ReC), it was confirmed that the reduction of carbon dioxide did not occur substantially. In addition, it was confirm that the photocatalyst for carbon dioxide reduction according to Example 1 in which TiO2 was used as an electron acceptor has significantly higher reduction efficiency of carbon dioxide compared to the photocatalyst for carbon dioxide reduction according to Comparative Example 3 in which ZrO2 was used as an electron acceptor.

Figure 22:
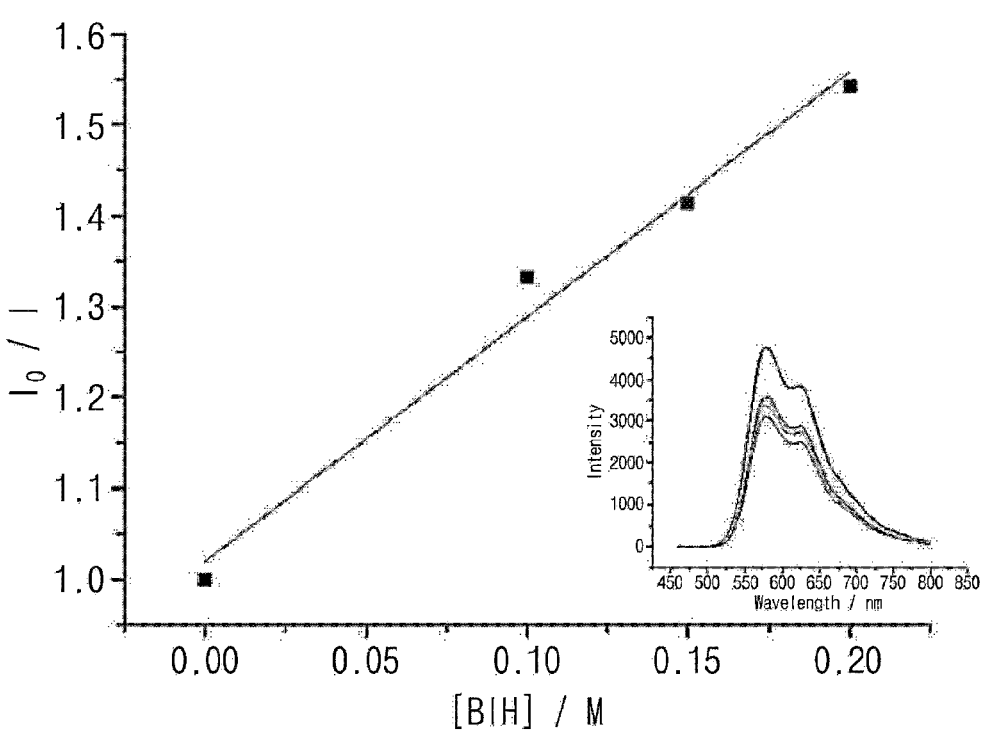
FIG. 22 is Stern-Volmer measurement graph of a carbon dioxide reduction experiment using the carbon dioxide reducing photocatalyst according to Example 1 of the present invention.

FIG. 22 is a Stern-Volmer measurement graph of a carbon dioxide reduction experiment through a photocatalyst for carbon dioxide reduction according to Example 1 of the present invention.

Referring to FIG. 22, a carbon dioxide reduction experiment was performed through the photocatalyst for carbon dioxide reduction according to Example 1, and the PL intensity according to the concentration of the electron donor (BIH) was measured and shown. As can be seen in FIG. 22, it was confirmed that the PL intensity decreased as the concentration of the electron donor (BIH) increased. Accordingly, it was confirmed that P3HT was subject to reductive quenching by electron donor (BIH).

Figure 23:
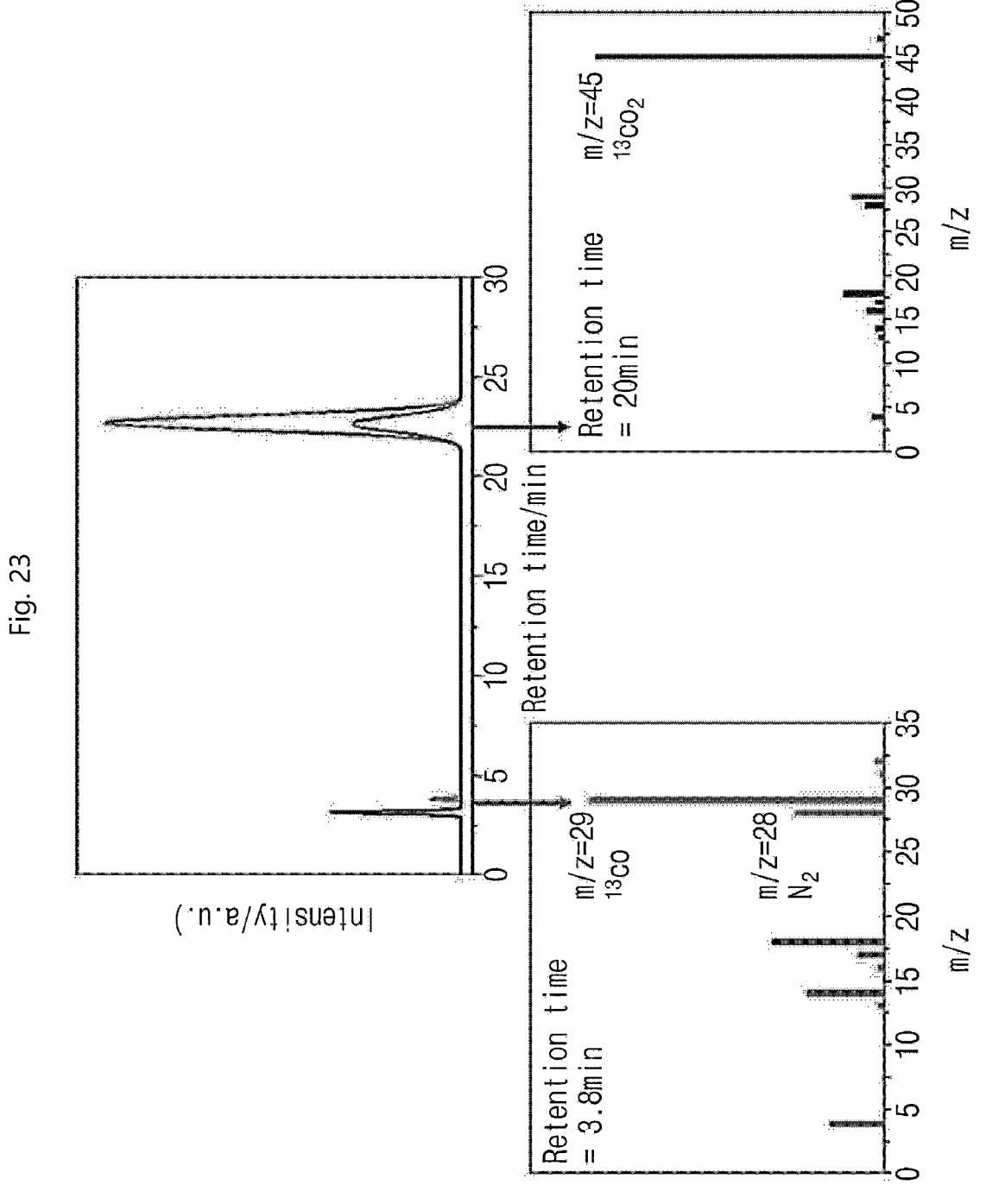
FIGS. 23 and 24 is a graph of analyzing carbon monoxide generated after conducting the carbon dioxide reduction experiment through the carbon dioxide reducing photocatalyst according to Example 1 of the present invention.
Figure 24:
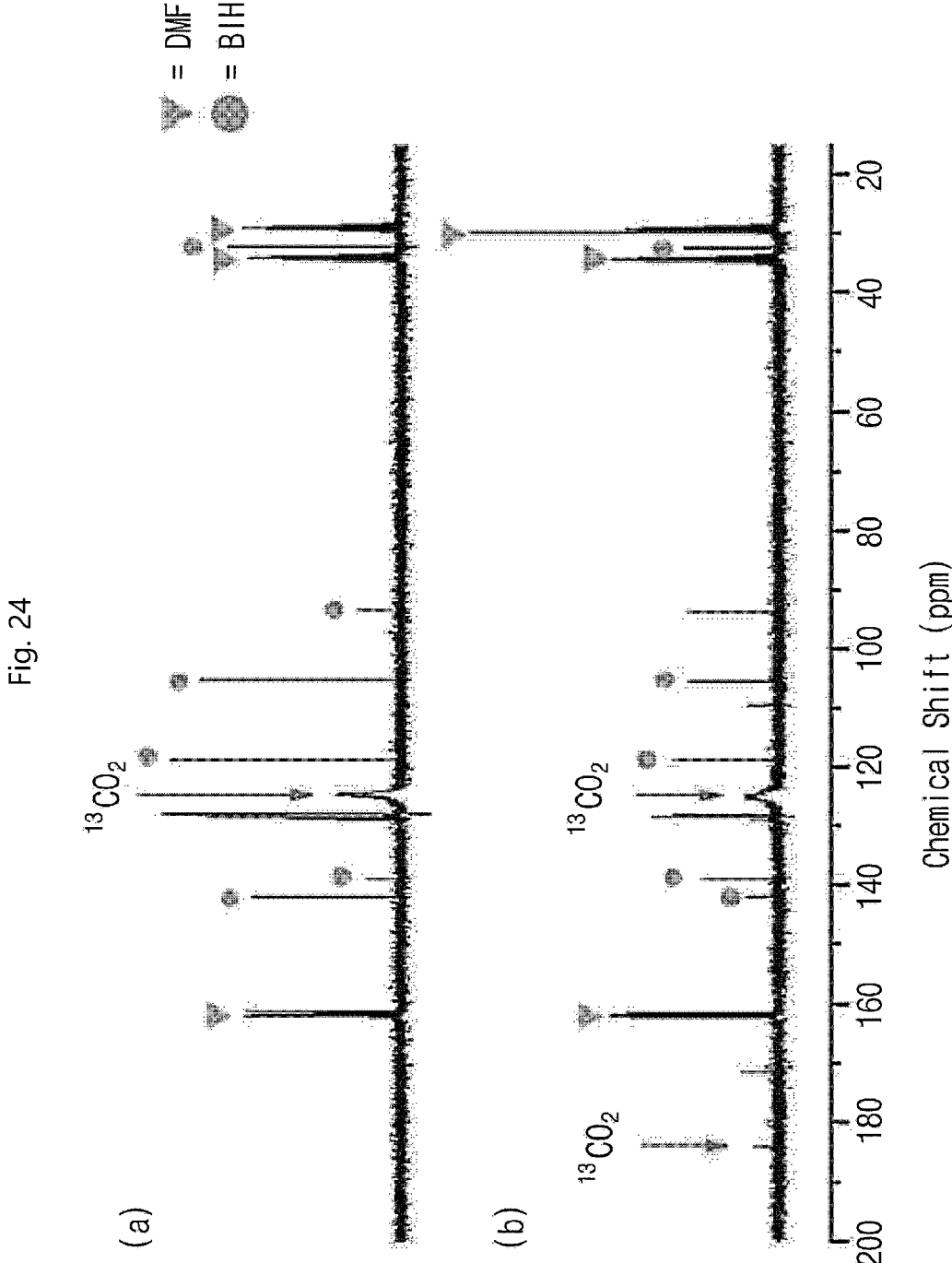

FIGS. 23 and 24 are graphs for analyzing the carbon monoxide produced after performing a carbon dioxide reduction experiment through the photocatalyst for carbon dioxide reduction according to Example 1 of the present invention.

Referring to FIG. 23, after performing a carbon dioxide reduction experiment through the photocatalyst for carbon dioxide reduction according to Example 1, GC-MS analysis of the produced carbon monoxide was performed and shown. More specifically, $^{13}CO2$ was used as carbon dioxide used in the experiment.

As can be seen in FIG. 23, as a result of comparing before and after the photoreaction, it was confirmed that there was decrease of 45, which is the molecular weight of $^{13}CO2$, and increase of 29, which is the molecular weight of 13CO. Accordingly, it was confirmed that the carbon monoxide was produced by the reduction of injected carbon dioxide, not by external factors or decomposition of carbon monoxide attached to the rhenium catalyst (ReC).

Referring to FIG. 24, a carbon dioxide reduction experiment was performed through the photocatalyst for carbon dioxide reduction according to Example 1, and $^{13}C$ NMR of the produced carbon monoxide was measured and shown. As can be seen in FIG. 14, as a result of comparing before and after the photoreaction, it was confirmed that the amount of $^{13}CO2$ was decreased and the amount of $^{13}CO$ was increased. In addition, it was also confirmed that the peak of BIH used as an electron donor was decreased.

Figure 25:
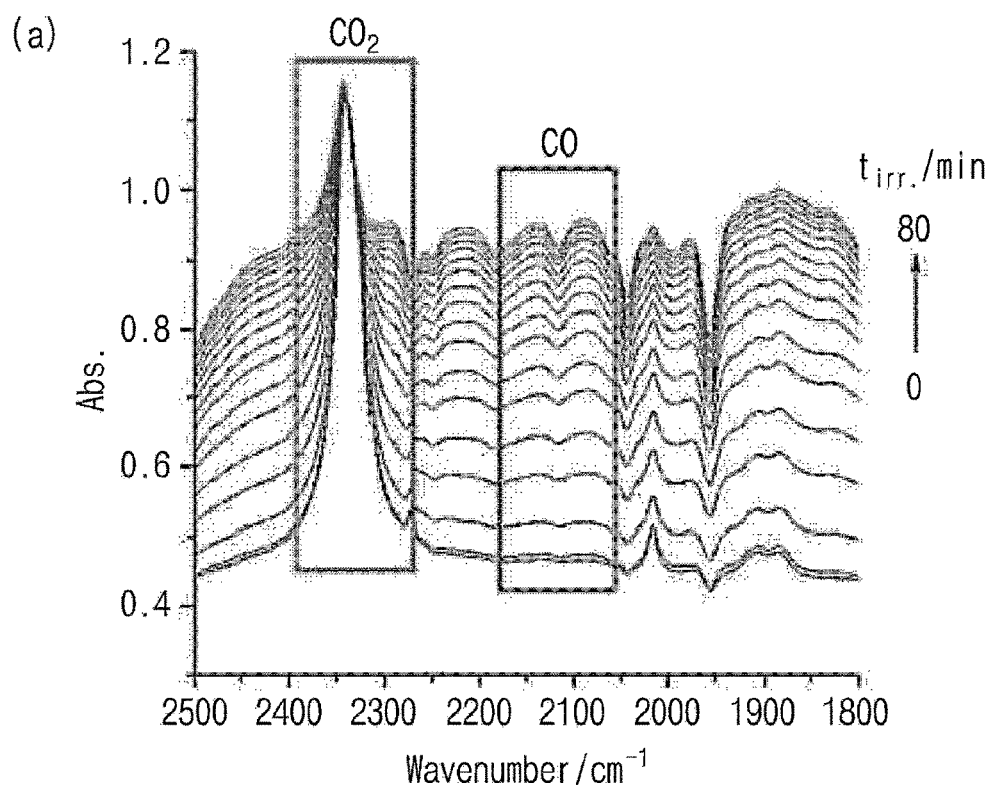
FIG. 25 is a graph showing a time-dependent FTIR peak of a rhenium catalyst included in the carbon dioxide reducing photocatalyst according to Example 1 of the present invention.
Figure 25:
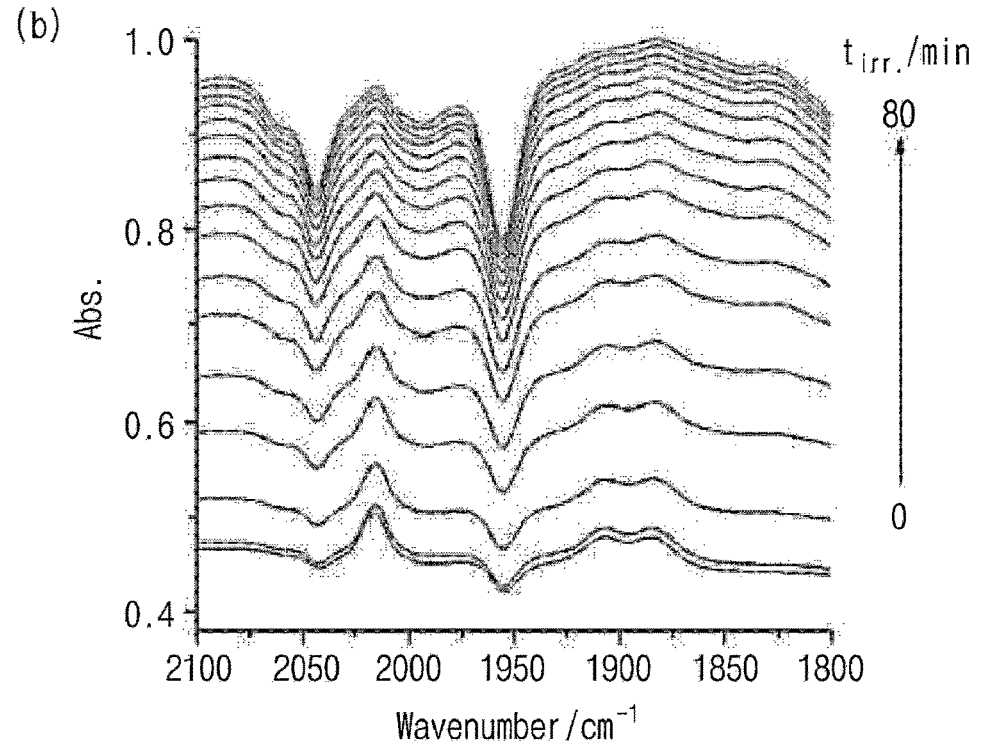

FIG. 25 is a graph showing FTIR peaks of the rhenium catalyst included in the photocatalyst for carbon dioxide reduction over time according to Example 1 of the present invention.

Referring to FIG. 25, in-situ FTIR measurement was performed to analyze the detailed reaction mechanism of the photocatalyst for carbon dioxide reduction according to Example 1. More specifically, after preparing the photocatalyst for carbon dioxide reduction according to Example 1, a change in the CO ligand peak of the rhenium catalyst was observed in a similar photoreaction environment.

As can be seen in FIG. 25, it was observed that the peak of the CO ligand of the rhenium catalyst was shifted toward a low wavenumber, and through this, it was possible to identify intermediate compounds in each step of the carbon dioxide reduction cycle. Accordingly, it was confirmed that the electron injection process of the photochemical reduction process was the same as the electron injection process of the electrochemical reduction process.

Figure 26:
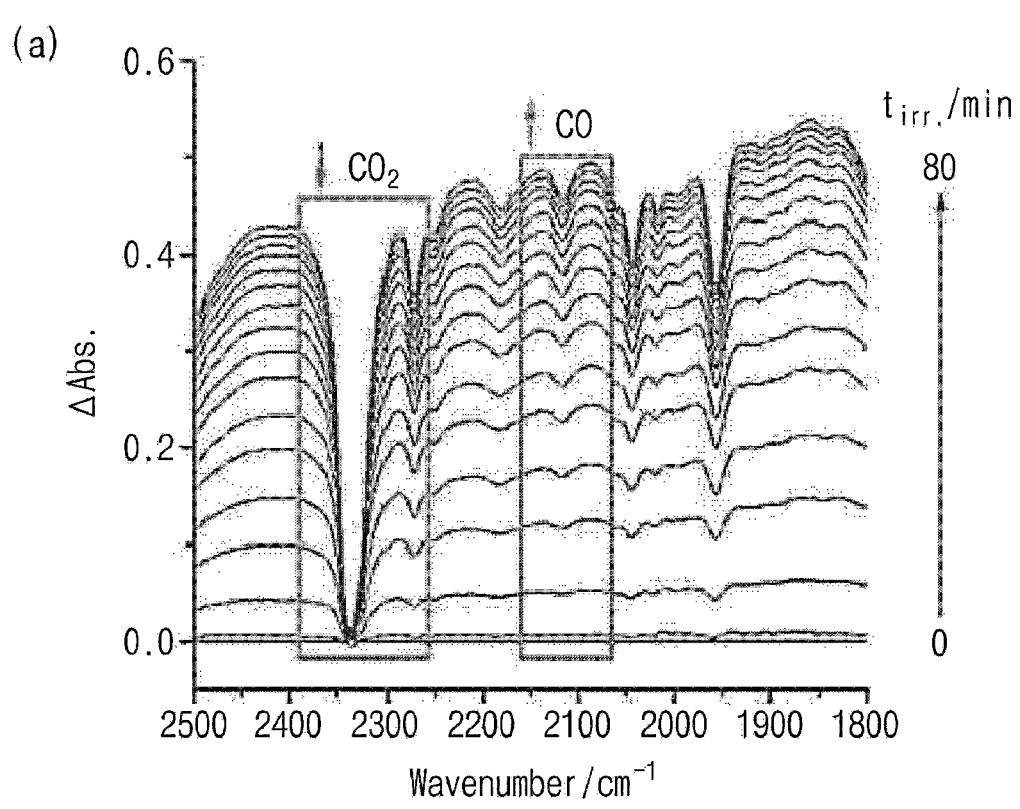
FIG. 26 is a graph showing the time-dependent FTIR peak change amount of the rhenium catalyst included in the carbon dioxide reducing photocatalyst according to Example 1 of the present invention.
Figure 26:
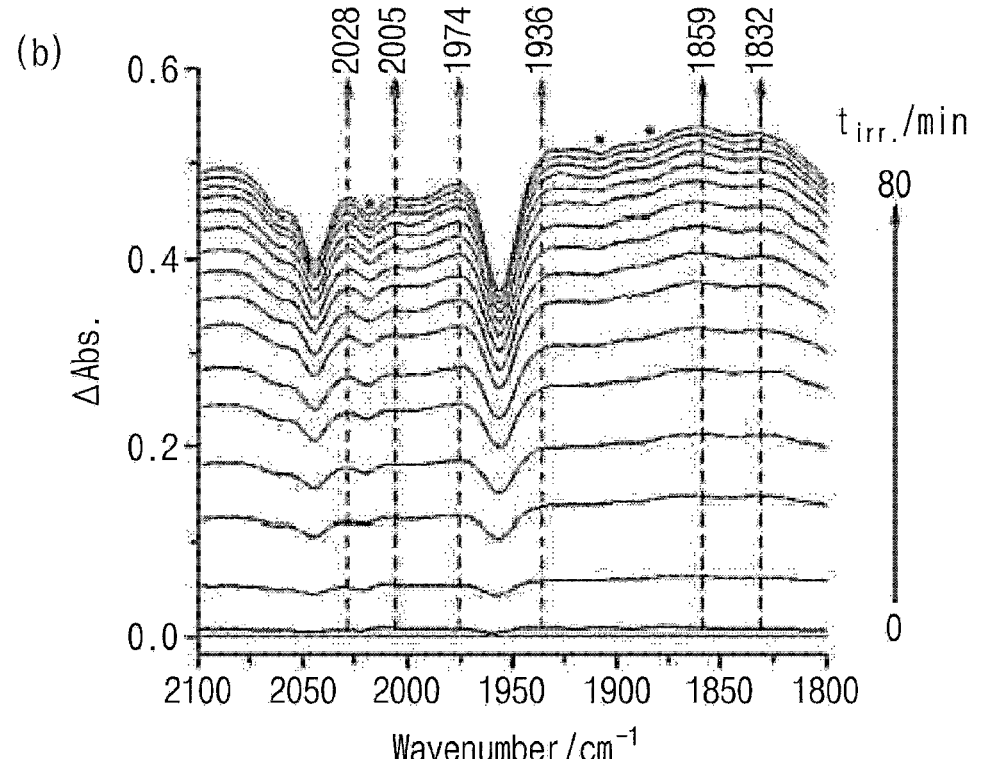

FIG. 26 is a graph showing the amount of change in the FTIR peak of the rhenium catalyst included in the photocatalyst for carbon dioxide reduction over time according to Example 1 of the present invention.

Referring to FIG. 26, in-situ FTIR measurement was performed to analyze the detailed reaction mechanism of the photocatalyst for carbon dioxide reduction according to Example 1. More specifically, after preparing the photocatalyst for carbon dioxide reduction according to Example 1, the amount of change in the CO ligand peak of the rhenium catalyst was observed in a similar photoreaction environment.

As can be seen in FIG. 26, it was confirmed that carbon dioxide was decreased and free CO was increased. In addition, the red arrow was confirmed as the first reduction peak of the rhenium catalyst, and the blue arrow was confirmed as a structure in which one molecule of chlorine was removed and DMF was combined at the site where the chlorine was removed. In addition, the yellow-green arrow was confirmed as two electron reduced species that accept two electrons and initiate a carbon dioxide reduction cycle.

Figure 27:
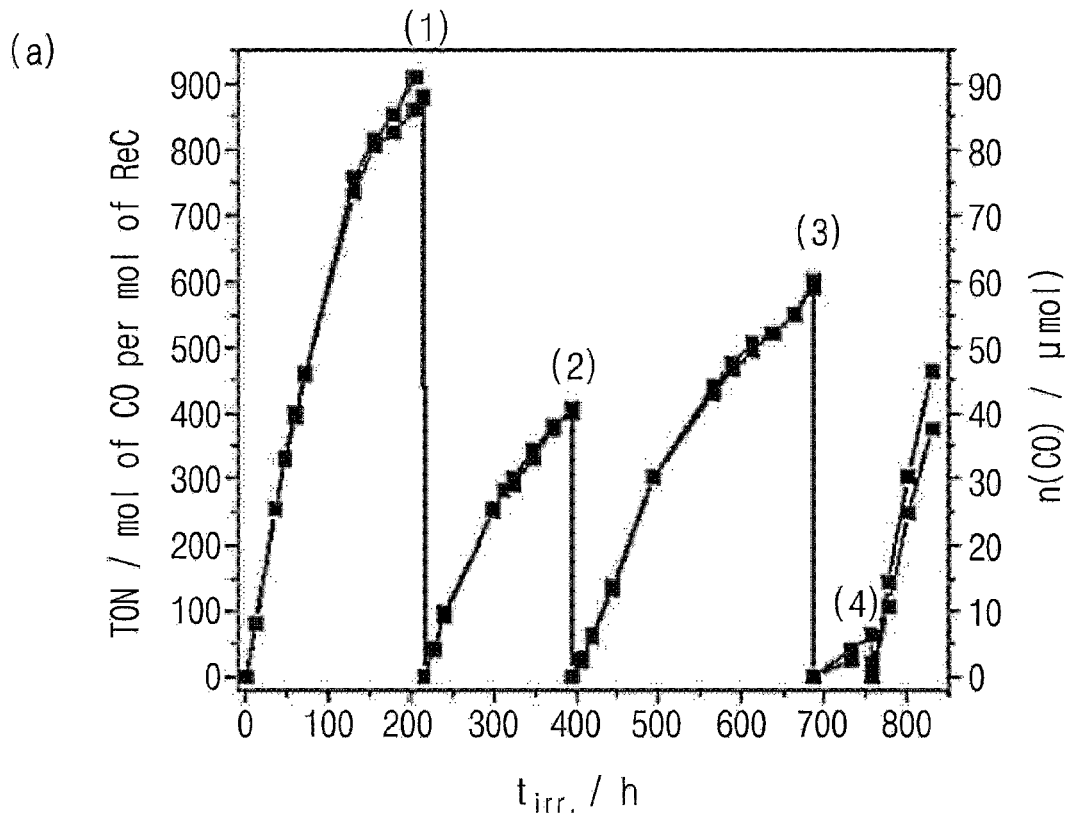
FIGS. 27 and 28 are graphs that test a lifetime of the carbon dioxide reducing photocatalyst according to Example 1 of the present invention.
Figure 27:
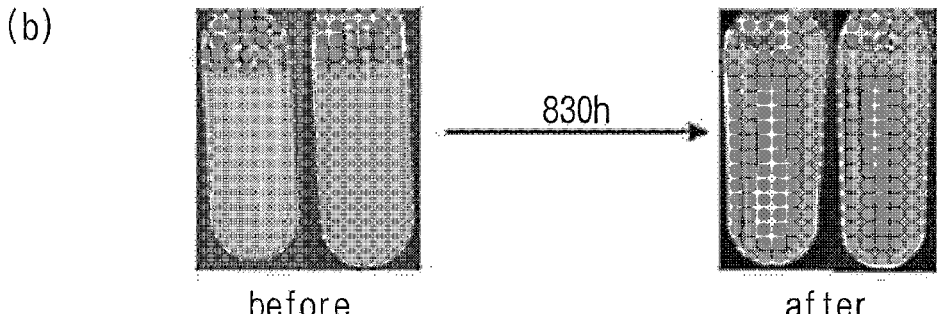
Figure 28:
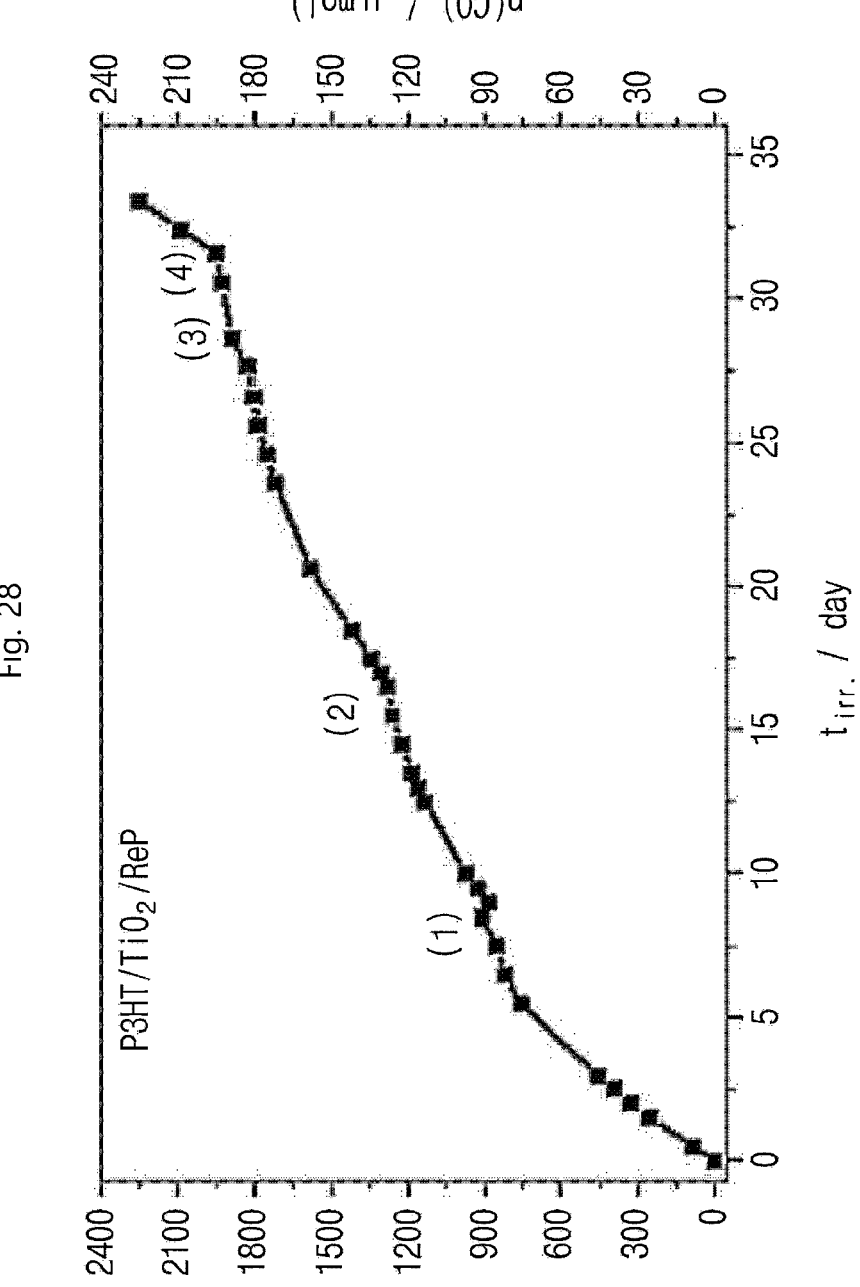

FIGS. 27 and 28 are graphs obtained by testing the lifetime of the catalyst for carbon dioxide reduction according to Example 1 of the present invention.

Referring to FIGS. 27 and 28, a carbon dioxide reduction experiment was performed through the catalyst for carbon dioxide reduction according to Example 1, and a photoreaction was performed while regularly supplying BIH and carbon dioxide gas until the efficiency of P3HT was decreased. In FIGS. 27 and 28, (1) shows CO2 rebubbling 30 min after addition of BIH (60 μmol), (2) shows CO2 rebubbling 30 min after addition of BIH (300 μmol), (3) shows CO2 rebubbling 30 min after addition of BIH (60 μmol), and (4) shows CO2 rebubbling 30 min after addition of ReC (0.1 μmol). As can be seen in FIGS. 27 and 28, it was confirmed that the catalyst for reducing carbon dioxide according to Example 1 had a lifespan of 1 month or more.

Although the present invention has been described in detail with reference to preferred embodiments, the scope of the present invention is not limited to specific embodiments and should be construed according to the appended claims. In addition, those skilled in the art will understand that many modifications and variations are possible without departing from the scope of the present invention.

INDUSTRIAL APPLICABILITY

A photocatalyst for reducing carbon dioxide, a method for producing the same, and a method for reducing carbon dioxide according to embodiments of the present invention can reduce carbon dioxide to stably and efficiently produce carbon monoxide.

The invention claimed is:

1. A method comprising:
   preparing a first source solution that includes a poly 3-hexyl thiophene (P3HT) polymer concentrator;
   providing an electron acceptor that includes titanium dioxide ($TiO_2$) in the first source solution, thereby producing a preliminary photocatalyst in which the P3HT polymer concentrator is deposited on the electron acceptor;
   providing the preliminary photocatalyst in a second source solution containing a rhenium catalyst, thereby depositing the rhenium catalyst on the electron acceptor and producing a carbon dioxide reducing photocatalyst, wherein a content of the P3HT polymer concentrator in the carbon dioxide reducing photocatalyst is 0.5 mg per 10 mg of the electron acceptor; and
   adsorbing an additive on a surface of the electron acceptor, wherein the additive includes trifluoroethanol (TFE),
   wherein the carbon dioxide reducing photocatalyst has a carbon dioxide reduction efficiency that is greater than a carbon dioxide reduction efficiency of an alternative carbon dioxide reducing photocatalyst prepared by depositing the rhenium catalyst on an alternative electron acceptor before depositing the P3HT polymer concentrator on the alternative electron acceptor.

2. A method for reducing carbon dioxide, the method comprising:
   preparing the carbon dioxide reducing photocatalyst according to claim 1;
   mixing the carbon dioxide reducing photocatalyst with an electron donor and a photoreaction solvent, wherein the photoreaction solvent comprises an additive that includes trifluoroethanol (TFE); adsorbing the additive on the surface of the electron acceptor; and irradiating light.

* * * * *